US012623477B2

(12) United States Patent
Niwa et al.

(10) Patent No.: US 12,623,477 B2
(45) Date of Patent: May 12, 2026

(54) LIQUID DISCHARGE APPARATUS AND CONTROL METHOD OF LIQUID DISCHARGE APPARATUS

(71) Applicant: SEIKO EPSON CORPORATION, Tokyo (JP)

(72) Inventors: Keisuke Niwa, Chino (JP); Mitsuhiro Koseki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 18/522,737

(22) Filed: Nov. 29, 2023

(65) Prior Publication Data

US 2024/0174014 A1 May 30, 2024

(30) Foreign Application Priority Data

Nov. 30, 2022 (JP) ................................. 2022-191581

(51) Int. Cl.
*B41J 29/17* (2006.01)
*B41J 2/01* (2006.01)
*B41J 11/00* (2006.01)

(52) U.S. Cl.
CPC ............. *B41J 29/17* (2013.01); *B41J 11/007* (2013.01); *B41J 2/01* (2013.01); *B41J 2002/012* (2013.01)

(58) Field of Classification Search
CPC ...... B41J 11/007; B41J 29/17; B41J 2/16585; B41J 29/393; B41J 2/16517; B41J 29/38; B41J 2/16535; B41J 2/04501; B41J 2002/16573; B41J 2/185
See application file for complete search history.

(56) References Cited

FOREIGN PATENT DOCUMENTS

| | | |
|---|---|---|
| JP | 2004131202 | 4/2004 |
| JP | 2005-169968 A | 6/2005 |
| JP | 2022138113 | 9/2022 |

*Primary Examiner* — Jannelle M Lebron
(74) *Attorney, Agent, or Firm* — WORKMAN NYDEGGER

(57) ABSTRACT

A liquid discharge apparatus includes a transport belt that transports a medium, a discharge section that discharges a liquid to the medium transported by the transport belt, a cleaning mechanism that cleans the transport belt, and a control section that controls the cleaning mechanism. The cleaning mechanism includes a web that abuts against the transport belt and wipes off the liquid on the transport belt, and a driving section that changes a wiping surface of the web that abuts against the transport belt. The control section performs a first operation of changing the wiping surface of the web that abuts against the transport belt a predetermined number of times within a cleaning period for cleaning the transport belt.

9 Claims, 12 Drawing Sheets

RD1

| PRINTING DUTY VALUE | 0-10% | 11-30% | 31-60% | 61-100% |
|---|---|---|---|---|
| NUMBER OF TIMES OF WEB SENDING | 1 | 3 | 6 | 10 |

LIQUID DISCHARGE APPARATUS AND CONTROL METHOD OF LIQUID DISCHARGE APPARATUS

The present application is based on, and claims priority from JP Application Serial Number 2022-191581, filed Nov. 30, 2022, the disclosure of which is hereby incorporated by reference herein in its entirety.

BACKGROUND

1. Technical Field

The present disclosure relates to a liquid discharge apparatus including a discharge section that discharges a liquid such as ink to a medium, and a control method of the liquid discharge apparatus.

2. Related Art

For example, JP-A-2005-169968 discloses a printing apparatus (an example of a liquid discharge apparatus) including a transport belt that transports a medium and a discharge section that discharges a liquid such as ink toward the medium.

This recording apparatus includes a belt cleaner that removes ink adhering to the transport belt. The belt cleaner includes a cleaning blade that scrapes off the ink adhering to the belt, and a cleaning web that wipes off the ink remaining after scraping off. The cleaning web is disposed downstream of the cleaning blade in the belt rotation direction. In the recording apparatus, the cleaning web is rotationally driven by a preset amount, and the web on the belt contact surface becomes a new surface. In addition, the cleaning web is timely driven by a web drive motor to wind up the residual ink and the cleaning liquid collected on the cleaning web side. The cleaning web drive motor is driven when a cleaning web driving signal is input from a control unit, and the rotation of the cleaning web drive motor causes a roller on the winding side of the cleaning web to rotate. As a result, a predetermined amount of the web is wound up, and the contact surface with the belt becomes a new surface. As described above, a configuration is disclosed in which the web drive motor appropriately sends out the cleaning web, and thus a new web contact surface can always be sent out to the belt surface.

In order to extend the life of a cleaning mechanism such as a belt cleaner, it is conceivable to increase the total length of the web, but in that case, the cleaning mechanism itself may become larger. On the other hand, when the total length of the web is shortened, the life of the web is shortened. Thus, the frequency of replacement of the web is increased, and as a result, the burden on the user or the serviceman is increased. That is, in the related art, the size of the apparatus may be increased and the frequency of replacement may be increased, and it was desired to extend the life of the web.

SUMMARY

According to an aspect of the present disclosure, there is provided a liquid discharge apparatus including: a transport belt that transports a medium; a discharge section that discharges a liquid to the medium transported by the transport belt; a cleaning mechanism that cleans the transport belt; and a control section that controls the cleaning mechanism, in which the cleaning mechanism includes a web that abuts against the transport belt and wipes off the liquid on the transport belt, and a driving section that changes a wiping surface of the web that abuts against the transport belt, and the control section performs a first operation of changing the wiping surface of the web that abuts against the transport belt a predetermined number of times within a cleaning period for cleaning the transport belt.

According to another aspect of the present disclosure, there is provided a control method of a liquid discharge apparatus including a transport belt that transports a medium, a discharge section that discharges a liquid to the medium transported by the transport belt, a web that abuts against the transport belt and wipes off the liquid on the transport belt, and a driving section that changes a wiping surface of the web that abuts against the transport belt, the method including: a first step of changing a wiping surface of the web that abuts against the transport belt, in which the first step is performed a predetermined number of times within a cleaning period for cleaning the transport belt.

DESCRIPTION OF EMBODIMENTS

Figure 1:
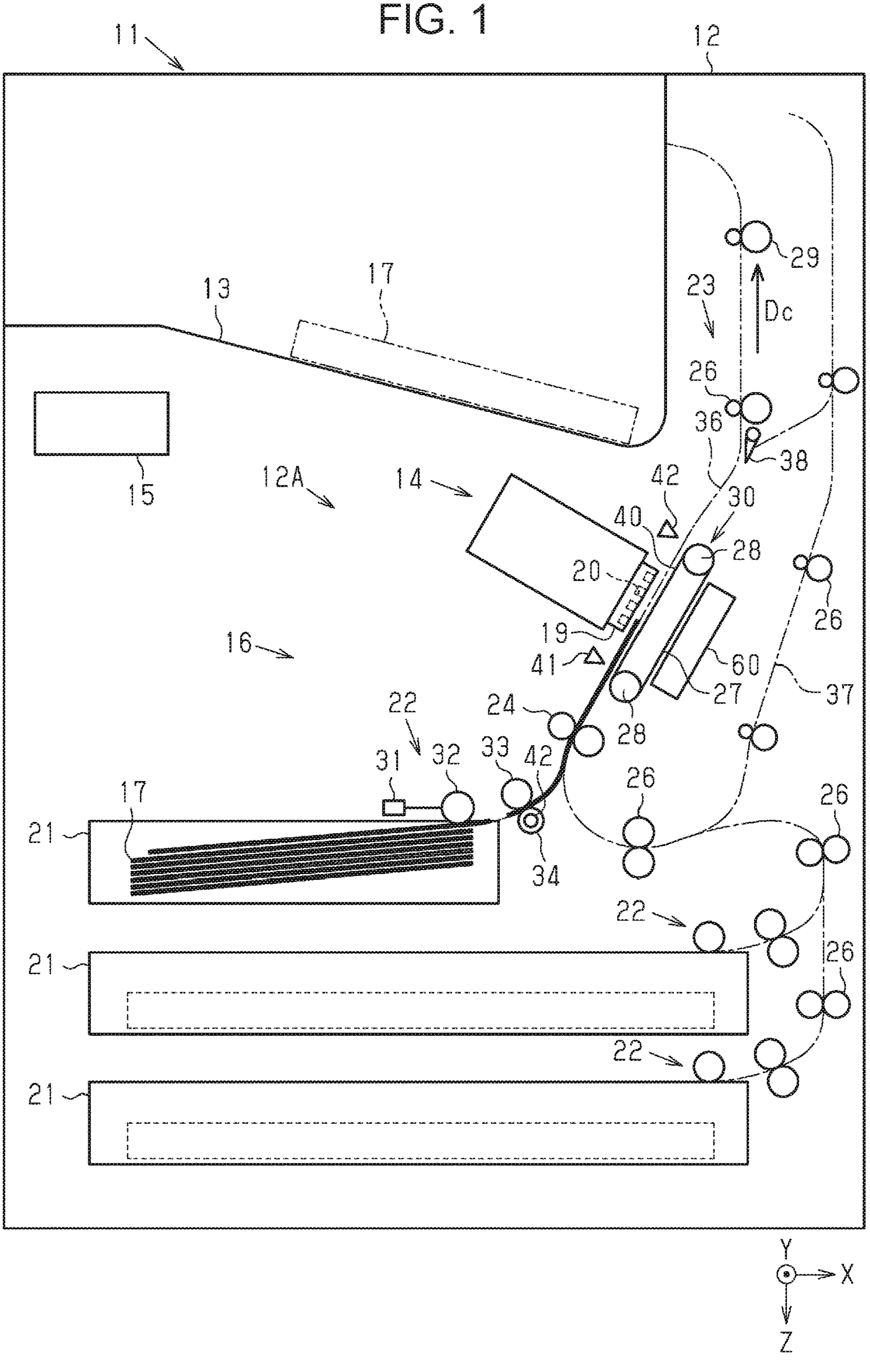
FIG. 1 is a schematic front sectional view illustrating a liquid discharge apparatus according to an embodiment.

Hereinafter, an embodiment of a liquid discharge apparatus will be described with reference to the drawings. The liquid discharge apparatus of the present embodiment is, for example, an ink jet type printer which discharges ink, which is an example of a liquid, to perform printing on a medium such as a paper sheet. In FIG. 1, a direction of gravity is indicated by a Z axis, and a direction along a horizontal plane is indicated by an X axis and a Y axis, assuming that a liquid discharge apparatus 11 is placed on the horizontal plane. The X axis, the Y axis, and the Z axis are orthogonal to each other. In the following description, since the direction along the Y axis is the width direction of a medium 17, the direction along the Y axis is also referred to as a width direction Y. Since the direction along the Z axis is a direction parallel to gravity, the direction along the Z axis is also referred to as a vertical direction Z.

Configuration of Liquid Discharge Apparatus 11

As illustrated in FIG. 1, the liquid discharge apparatus 11 may include a stacker 13, a printing section 14, a control section 15, and a transport device 16 in an apparatus main body 12.

Various configurations of the liquid discharge apparatus 11 are accommodated in the apparatus main body 12. Specifically, the apparatus main body 12 accommodates the printing section 14, the control section 15, and the transport device 16.

The stacker 13 receives the medium 17 transported by the transport device 16. The stacker 13 can load a plurality of printed media 17.

The printing section 14 may have a discharge section 19. A plurality of nozzles 20 are opened in the discharge section 19. The printing section 14 may be provided with the discharge section 19 inclined with respect to the horizontal plane. The printing section 14 performs printing on the transported medium 17 by discharging the liquid from the nozzle 20. The printing section 14 of the present embodiment employs a line printing method that performs printing on the transported medium 17. The printing section 14 may include a carriage (not illustrated) that supports the discharge section 19. A serial printing method that performs printing on the medium 17 by discharging the liquid from the nozzle 20 by the discharge section 19 while the carriage is moving in the width direction Y may be employed.

The control section 15 comprehensively controls driving of each mechanism in the liquid discharge apparatus 11 and controls various operations executed in the liquid discharge apparatus 11.

The control section 15 may be configured as a circuit including (α) one or more processors that execute various types of processing according to a computer program, (β) one or more dedicated hardware circuits that execute at least a part of various types of processing, or (γ) a combination thereof. The hardware circuit is, for example, an application-specific integrated circuit. The processor includes a CPU and a memory such as a RAM and a ROM, and the memory stores a program code or a command configured to cause the CPU to execute processing. A memory, that is, a computer-readable medium, includes any readable medium accessible by a general purpose or dedicated computer.

Configuration of Transport Device 16

The transport device 16 includes a medium placement section 21, a feeding section 22, and a transport section 23. The transport device 16 may include a plurality of medium placement sections 21. In this case, the transport device 16 may include the same number of feeding sections 22 as the medium placement section 21. The transport section 23 may include a transport roller pair 24, a sending roller pair 26, a transport belt mechanism 30, and an ejection roller pair 29. The transport belt mechanism 30 may include a transport belt 27 and one pair of rollers 28. As described above, the liquid discharge apparatus 11 includes the transport belt 27 that transports the medium 17, and the discharge section 19 that discharges the liquid to the medium 17 transported by the transport belt 27. The liquid discharge apparatus 11 of the present embodiment includes a cleaning mechanism 60 for cleaning the transport belt 27. The control section 15 controls the cleaning mechanism 60.

The feeding section 22 feeds the medium 17 accommodated in the medium placement section 21 from the corresponding medium placement section 21 to a transport path 36 one by one. The feeding section 22 may include a feeding motor 31, a pickup roller 32, a feeding roller 33, and a separation roller 34.

Each of the transport roller pair 24, the sending roller pair 26, and the ejection roller pair 29 includes a roller that comes into contact with the front surface of the medium 17 and a roller that comes into contact with the back surface of the medium 17. One of the two rollers may be a driving roller that is rotationally driven, and the other may be a driven roller that is driven to rotate.

In FIG. 1, the transport path 36 and an inversion path 37 through which the medium 17 is transported are illustrated by a one-dot chain line. The transport path 36 couples the medium placement section 21 with the stacker 13. The inversion path 37 couples the transport path 36 downstream of the printing section 14 with the transport path 36 upstream of the printing section 14. The inversion path 37 is a path for returning the medium 17 printed on one surface to the upstream of the printing section 14 when performing printing on both surfaces of the medium 17. The transport device 16 may include a flap 38 that switches a path for transporting the medium 17.

The medium placement section 21 may be capable of accommodating a plurality of media 17 in a stacked state. A plurality of media 17 are placed on the medium placement section 21. The placement is a state of being placed on top and being movable by the application of an external force.

The transport roller pair 24 transports the medium 17 sent from the feeding roller 33. The transport roller pair 24 transports the medium 17 by rotating in a state of pinching the medium 17. Of the two rollers constituting the transport roller pair 24, one roller may be a toothed roller. When a roller which comes into contact with the printed surface of the medium 17 printed on one surface is a toothed roller, deterioration of print quality can be suppressed.

The transport device 16 may include a plurality of sending roller pairs 26. The plurality of sending roller pairs 26 may be provided in the transport path 36 and the inversion path 37. The sending roller pair 26 transports the medium 17 along the transport path 36 or the inversion path 37 by rotating in a state of pinching the medium 17.

The transport belt 27 may transport the medium 17 sent from the transport roller pair 24. The transport belt 27 is an annular belt. The transport belt 27 is laid over one pair of rollers 28. The transport belt 27 circulates around a pair of rollers 28 as one roller 28 rotates. The transport belt 27 has a transport surface 40 that transports the medium 17. The transport surface 40 is a flat surface of the outer peripheral surface of the transport belt 27 that supports the medium 17 by, for example, electrostatic adsorption. The transport belt 27 may be provided such that the transport surface 40 is parallel to a nozzle surface 19A of the discharge section 19. The transport belt 27 supports a part of the medium 17 that is printed by the printing section 14. The transport belt 27 transports the medium 17 in a transport direction Dc by circulating in a state of supporting the medium 17. The transport direction Dc is a direction along the transport path 36 and is a direction from the medium placement section 21 toward the stacker 13.

The ejection roller pair 29 may be provided at the downstream end of the transport path 36. The ejection roller pair 29 ejects the printed medium 17 to the stacker 13 by rotating in a state of pinching the medium 17.

The feeding motor 31 causes the pickup roller 32 to rotate. The pickup roller 32 sends out the uppermost medium 17 placed on the medium placement section 21 one by one.

The feeding roller 33 comes into contact with the upper surface of the medium 17 sent by the pickup roller 32. That is, when the pickup roller 32 causes the double sending in which the plurality of media 17 are sent, the feeding roller 33 comes into contact with the medium 17 positioned at the top. The feeding roller 33 sends the medium 17 positioned at the top in the transport direction Dc.

The separation roller 34 nips the medium 17 with the feeding roller 33. The separation roller 34 is a driven roller that can rotate in the forward and reverse directions. Therefore, the separation roller 34 prevents the lower medium 17 from being sent out in the transport direction Dc when double sending occurs.

The liquid discharge apparatus 11 includes a first detection section 41 and a second detection section 42 capable of detecting the medium 17 on both sides that pinch the discharge section 19 in the transport direction Dc. The first detection section 41 detects the medium 17 at a position upstream of the discharge section 19 in the transport direction Dc. The second detection section 42 detects the medium 17 at a position downstream of the discharge section 19 in the transport direction Dc.

The control section 15 recognizes the position of the medium 17 on the transport path 36 based on each detection signal from the first detection section 41 and the second detection section 42. Further, the control section 15 detects that the medium 17 on the transport surface 40 of the transport belt 27 is jammed based on each signal from the first detection section 41 and the second detection section 42. After the first detection section 41 detects the medium 17, the control section 15 detects that the medium 17 is jammed on the transport surface 40 when there is no input of the detection signal indicating that the medium 17 is detected from the second detection section 42, even though the transport operation for the predetermined transport amount is ended.

Configurations of Transport Belt Mechanism 30 and Cleaning Mechanism 60

Next, a detailed configuration of the transport belt mechanism 30 and the cleaning mechanism 60 will be described with reference to FIG. 2.

Figure 2:
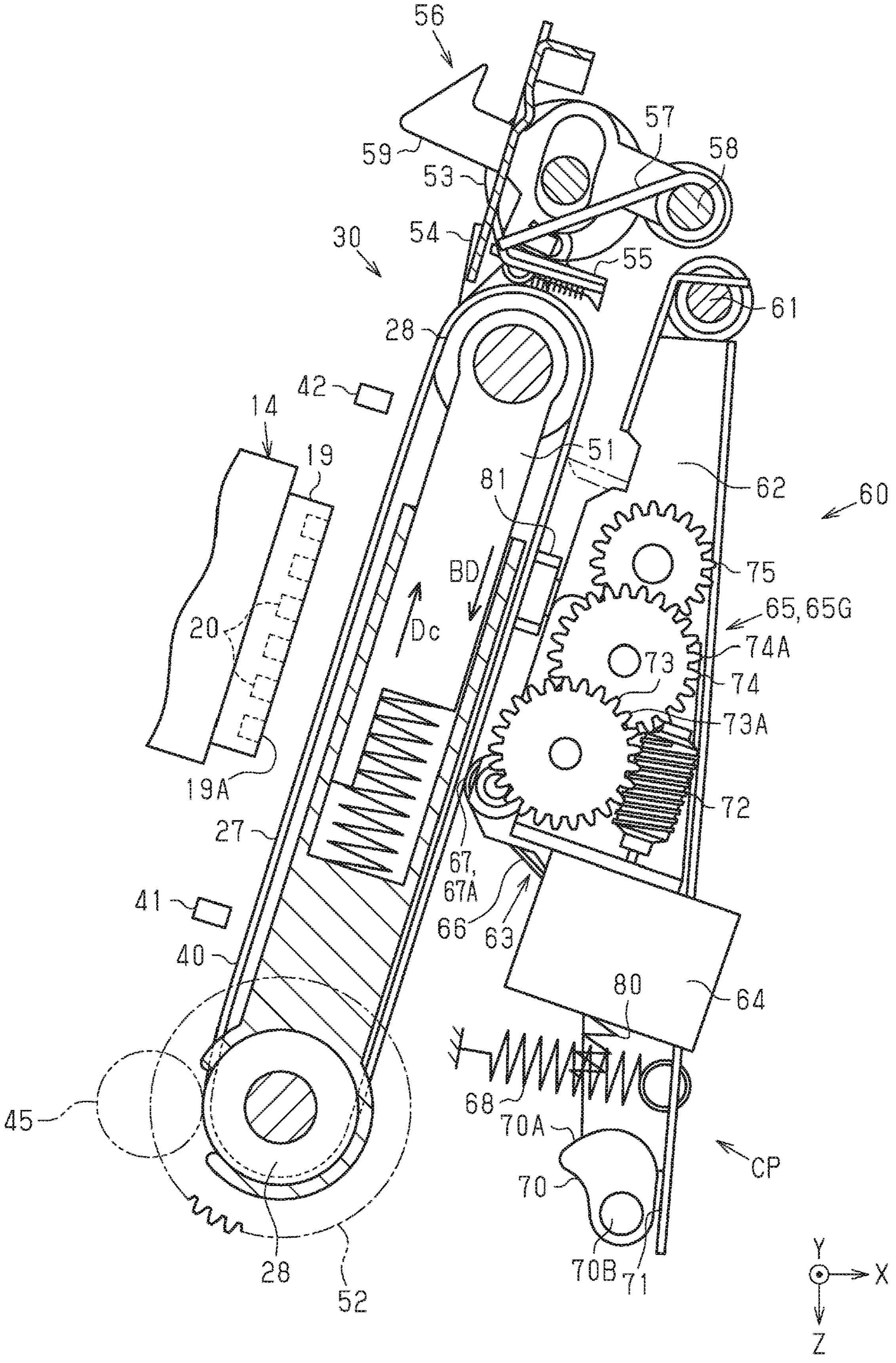
FIG. 2 is a schematic front view illustrating a cleaning mechanism.

As illustrated in FIG. 2, the cleaning mechanism 60 is disposed at a position opposite to the discharge section 19 with respect to the transport belt 27. The cleaning mechanism 60 cleans the surface of the transport belt 27 at a position opposite to the transport surface 40 of the transport belt 27. The cleaning mechanism 60 performs cleaning for removing the liquid such as ink adhering to the transport belt 27 from the transport belt 27 as a result of the discharge section 19 discharging the liquid in a state where the medium 17 is not present when jam occurs.

When the control section 15 detects jam in the medium 17 on the transport surface 40, the control section 15 causes the cleaning mechanism 60 to clean the transport belt 27. Specifically, when the control section 15 detects that the medium 17 is jammed, the control section 15 causes a display section 92 (refer to FIG. 8) to display a message including information indicating that the jam has occurred and information to urge the jam clearing. The user who read the message opens the cover (not illustrated) of the apparatus main body 12 and removes the jammed medium 17. The user who cleared the jam notifies the liquid discharge apparatus 11 that the jam is cleared by performing an operation for indicating "OK" on the operation section 91 (refer to FIG. 8). When the control section 15 receives the notification from the operation section 91 that the jam is cleared, the control section 15 causes the cleaning mechanism 60 to clean the transport belt 27.

Detailed Configuration of Transport Belt Mechanism 30

Next, the configurations of the transport belt mechanism 30 and the cleaning mechanism 60 will be described in detail with reference to FIGS. 2 to 4. First, a detailed configuration of the transport belt mechanism 30 will be described with reference to FIG. 2. As illustrated in FIG. 2, the transport belt mechanism 30 includes the endless transport belt 27, the pair of rollers 28, a support frame 51 that rotatably supports the pair of rollers 28, and a gear 52 provided coaxially with one of the rollers 28. The pair of rollers 28 are supported by the support frame 51 in a state of being urged in the direction away from each other. Therefore, a constant tension is applied to the transport belt 27 by the urging force acting on the pair of rollers 28 in the separation direction.

In the vicinity of the end portion on the downstream of the transport belt 27, a guide member 54 that guides the medium 17 on the transport surface 40 of the transport belt 27 to an ejection roller 53, and a destaticizing brush 55 that destaticizes the charge of the transport belt 27 are disposed. The destaticizing brush 55 is configured to be movable to an operating position illustrated in FIG. 2 which is close to or in contact with the transport belt 27 and a retracted position which is separated from the transport belt 27 by a cam mechanism 56 driven by a driving section (not illustrated).

The cam mechanism 56 includes a lever member 59 that is urged in one direction around a turning shaft 58 by the urging force of a spring 57. The spring 57 urges the lever member 59 in the direction in which the destaticizing brush 55 is disposed at the separated position. The lever member 59 turns in the direction opposite to the urging direction of the spring 57 by a driving section (not illustrated), and accordingly, the destaticizing brush 55 moves from the separated position to the contact position. One roller 28 is rotated by the power transmitted from a belt motor 97 (refer to FIG. 8) which is a driving source via the gear 52.

Further, a guide roller 45 illustrated by a two-dot chain line in FIG. 2 is disposed at a position on the upstream in the transport direction Dc on the transport surface 40 of the transport belt 27. The guide roller 45 is configured to be movable between the operating position that abuts against the transport surface 40 and the separated position that is separated from the transport surface 40 by the power of a guide motor 98 (refer to FIG. 8). Since the guide roller 45 moves in conjunction with the destaticizing brush 55, the guide motor 98 may also serve as a driving section of the destaticizing brush 55.

Detailed Configuration of Cleaning Mechanism 60

Next, a detailed configuration of the cleaning mechanism 60 will be described with reference to FIGS. 2 and 3. The cleaning mechanism 60 includes a support frame 62 that is rotatable within a predetermined angle range around a turning shaft 61. A cleaning section 63, a driving section 64, a power transmission mechanism 65, and the like are assembled to the support frame 62.

The cleaning section 63 is a part having a web 66 for cleaning. The web 66 is wound around a predetermined circulation path which will be described later. A part of the web 66 forms a wiping section 67 protruding toward the transport belt 27 in a state of facing the surface of the transport belt 27 opposite to the transport surface 40. The web 66 is intermittently sent (intermittently driven) by a driving force transmitted from the driving section 64 via the power transmission mechanism 65. By one intermittent sending of the web 66, the web 66 of a part of the wiping section 67 is changed from the web 66 contaminated with a liquid such as ink to the new web 66. That is, a wiping surface 67A of the wiping section 67 is changed to a new surface of the web 66 by one intermittent sending of the web 66.

In this manner, the cleaning mechanism 60 includes the web 66 that abuts against the transport belt 27 and wipes off the liquid on the transport belt 27, and the driving section 64 for intermittent driving to change the web 66 of a part of the wiping section 67 that abuts against the transport belt 27 to a new wiping surface 67A. The control section 15 performs the first operation of changing the wiping surface 67A of the web 66 that abuts against the transport belt 27 a predetermined number of times within the cleaning period for cleaning the transport belt 27.

The support frame 62 is urged to turn in the direction approaching the transport belt 27 by the urging force of the spring 68 of which one end is hooked at a position near the end portion on the side opposite to the turning shaft 61. The spring 68 is, for example, a tension spring made of a coil spring, and the other end thereof is hooked to a predetermined location of the support frame 51 constituting the transport belt mechanism 30 or a main frame (not illustrated). As described above, in the cleaning mechanism 60, the wiping section 67 is urged in the direction of approaching the transport belt 27 by the urging force of the spring 68.

The cleaning mechanism 60 includes the web 66, the driving section 64 that causes the web 66 to rotate, gears 72 to 75, which will be described later, and the like. Further, the cleaning mechanism 60 may include a wiper 87 (blade) illustrated by a two-dot chain line in FIG. 2. The wiper 87 is provided upstream of the wiping section 67 of the web 66 in a rotation direction BD in which the transport belt 27 rotates. The wiper 87 abuts against the transport belt 27 during the cleaning period and scrapes off the liquid on the transport belt 27. The cleaning mechanism 60 may include the wiper 87 and the driving section (not illustrated) of the wiper 87. The wiper 87 may be disposed at a position downstream of the wiping section 67 in the rotation direction BD of the transport belt 27 during cleaning.

The cleaning mechanism 60 includes a cam motor 69 (refer to FIG. 8) which is a driving source capable of rotating the support frame 62 around the turning shaft 61. A cam member 70 driven by the driving force of the cam motor 69 is disposed in the vicinity of the turning tip end portion of the support frame 62. The support frame 62 has an engaged surface portion 71 that can be engaged with the cam member 70 at a turning tip end portion (lower end portion) thereof. The cam member 70 is, for example, a rotary cam. The cam member 70 has a turning shaft 70B and an engaging surface 70A formed at a turning tip end portion thereof.

Figure 4:
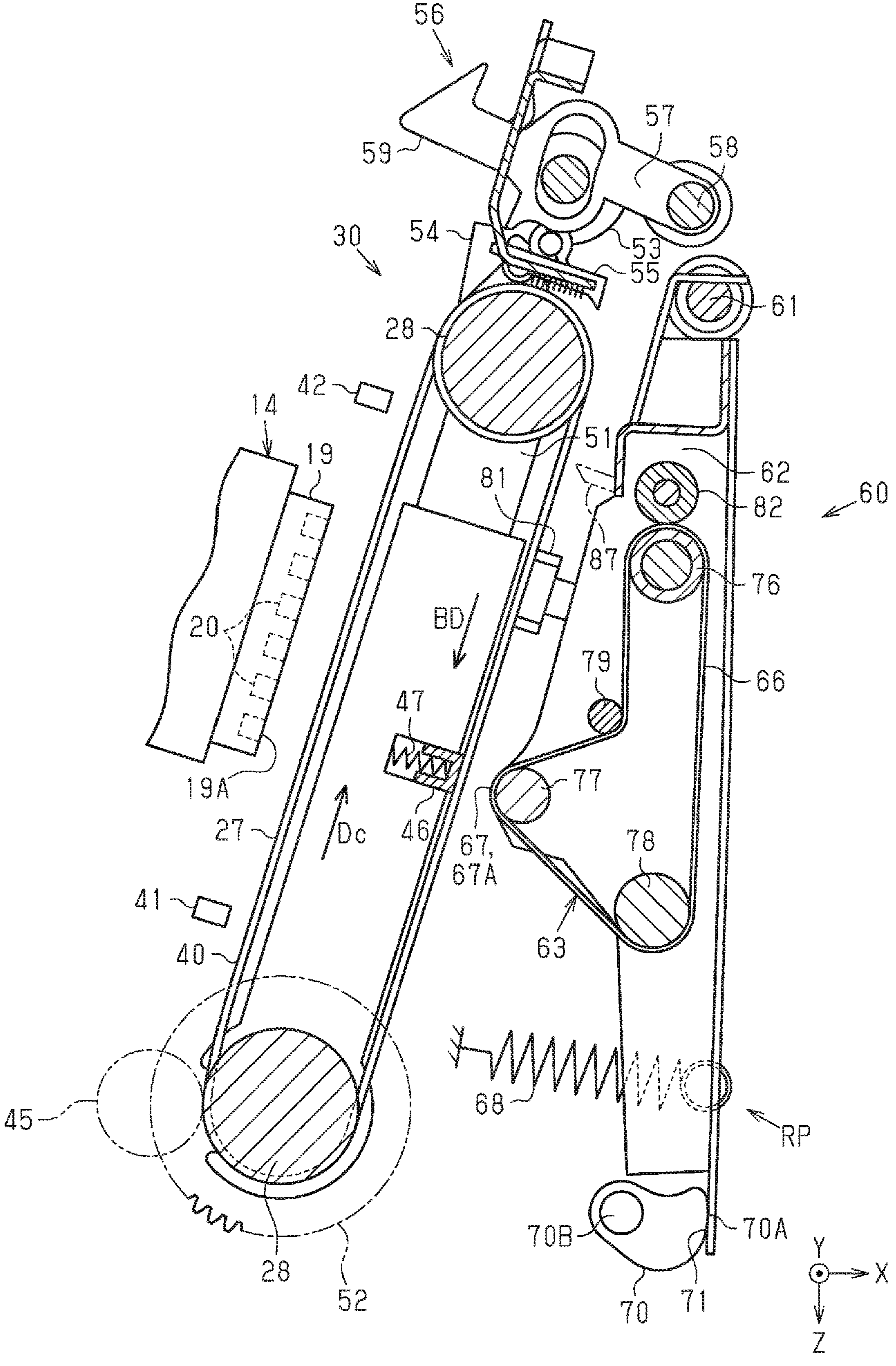
FIG. 4 is a schematic front sectional view illustrating the cleaning mechanism when being disposed in a retracted position, and a transport belt mechanism.
Figure 5:
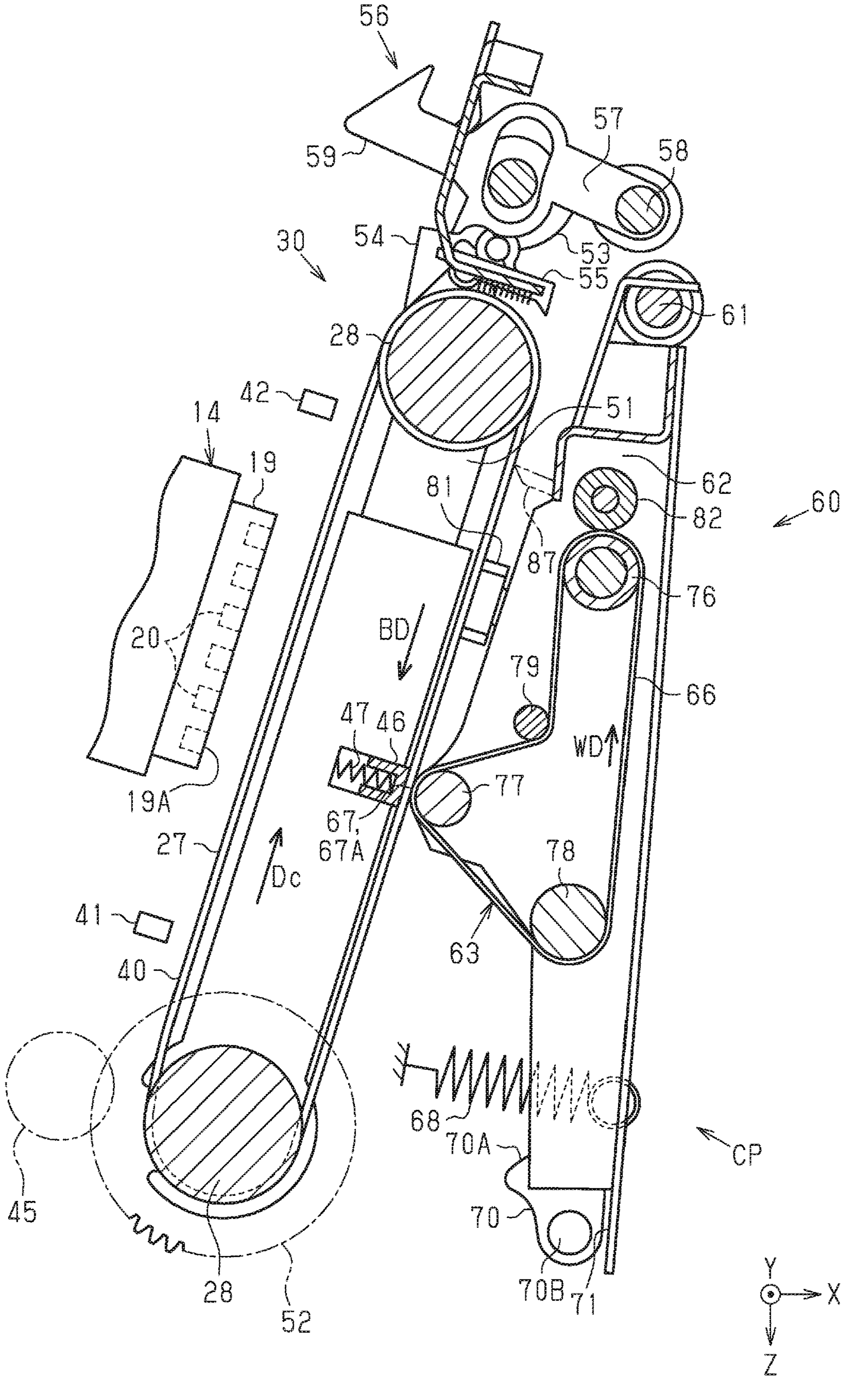
FIG. 5 is a schematic front sectional view illustrating the cleaning mechanism when being disposed in a cleaning position, and a transport belt mechanism.

As illustrated in FIGS. 2 and 5, the cam member 70 turns between a non-engaged position where the engaging surface 70A is separated from the engaged surface portion 71 and an engaged position where the engaging surface 70A abuts against the engaged surface portion 71 as illustrated in FIG. 4. Specifically, when the cam member 70 is in the non-engaged position illustrated in FIGS. 2 and 5, the engaging surface 70A of the cam member 70 is separated from the engaged surface portion 71, and accordingly, the support frame 62 turns clockwise in FIG. 2 by the urging force of the spring 68. As a result, the cleaning mechanism 60 is disposed in a cleaning position CP where the wiping section 67 abuts against the surface of the transport belt 27. On the other hand, when the cam member 70 is in the engaged position illustrated in FIG. 4, the engaged surface portion 71 is pushed by the engaging surface 70A of the cam member 70, and accordingly, the support frame 62 turns counter-clockwise in FIG. 2 from the cleaning position CP. As a result, the cleaning mechanism 60 is disposed in a retracted position RP where the wiping section 67 is separated from the transport belt 27.

Next, a detailed configuration of the cleaning section 63 including the web 66, the driving section 64, and the power transmission mechanism 65 will be described with reference to FIGS. 2 and 3.

The driving section 64 is, for example, a motor. The driving force of the driving section 64 is transmitted to the cleaning section 63 via the power transmission mechanism 65. The cleaning section 63 intermittently sends the web 66 in a sending direction WD (refer to FIG. 5) by the driving force of the driving section 64. The cleaning section 63 is driven to change the wiping surface 67A of the wiping section 67 from the cleaned web 66 contaminated with a liquid such as ink to the new web 66 before cleaning.

The power transmission mechanism 65 may be, for example, a gear mechanism 65G as illustrated in FIG. 2. The gear mechanism 65G includes a plurality of gears 72 to 75. That is, the gear mechanism 65G of the example illustrated in FIGS. 2 and 3 includes a worm gear 72 and gears 73 to 75 that are rotated by the driving force of the driving section 64. The two gears 73 and 74 are, for example, two-stage gears. The worm gear 72 meshes with a large gear 73A of the gear 73. A small gear 73B (refer to FIG. 3) of the gear 73 meshes with a large gear 74A of the gear 74. The small gear 74B (refer to FIG. 3) of the gear 74 meshes with the gear 75.

The gear 75 is a driving gear, and the web 66 is fixed to a shaft end portion of the driving roller 76, which is one of a plurality of rollers 76 to 78 (also refer to FIG. 4) over which the web 66 is laid. Further, the web 66 is guided to the wiping section 67 via a guide rod 79 extending in the width direction Y. As illustrated in FIG. 2, the support frame 62 is provided with a spring 80 that applies tension to the web 66 laid over the plurality of rollers 76 to 78.

From the above configuration, the reduction ratio of the gear mechanism 65G is large. Specifically, when the worm gear 72 makes a plurality of rotations, the gear 73 makes one rotation, when the gear 73 makes a plurality of rotations, the gear 74 makes one rotation, and when the gear 74 makes a plurality of rotations, the gear 75 makes one rotation. Therefore, the reduction ratio of the gear mechanism 65G is set to, for example, a predetermined value in the range of 10 to 30. As illustrated in FIG. 2, a position sensor 81 for detecting that the cleaning mechanism 60 is in the cleaning position CP is attached to the support frame 51 constituting the transport belt mechanism 30.

Figure 3:
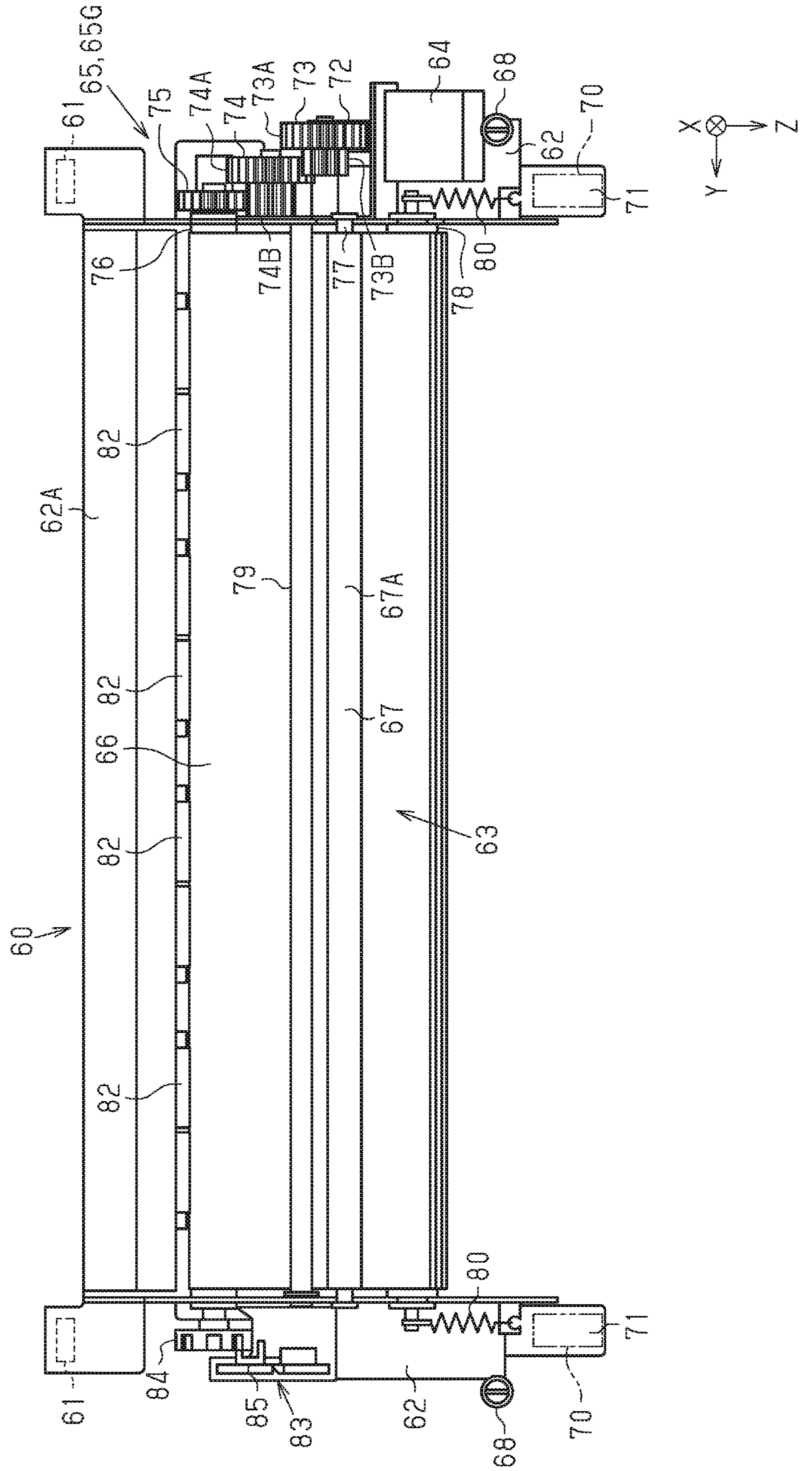
FIG. 3 is a schematic side view illustrating the cleaning mechanism.

Further, as illustrated in FIG. 3, a plurality of pressing rollers 82 are disposed at intervals in the width direction Y in a frame portion 62A extending in the width direction Y. The plurality of pressing rollers 82 pinch the web 66 with the driving roller 76 (refer to FIG. 4) with a predetermined pressing force. Further, in the cleaning mechanism 60 illustrated in FIG. 3, the detection section 83 is disposed on the surface opposite to the surface on which the driving section 64 and the power transmission mechanism 65 are assembled, with the disposition region of the web 66 pinched in the width direction Y. The detection section 83 measures the sending amount of the web 66 by detecting the rotation of the driving roller 76. The detection section 83 includes a detected section 84 and a sensor 85.

Structure of Cleaning Section 63

Next, a configuration of the cleaning section 63 will be described with reference to FIGS. 4 and 5. FIG. 4 shows a state where the cleaning mechanism 60 is in the retracted position RP. Further, FIG. 5 shows a state where the cleaning mechanism 60 is in the cleaning position CP.

First, a position switching operation in which the cleaning mechanism 60 turns between the retracted position RP and the cleaning position CP will be described. As illustrated in FIG. 4, when the cam member 70 turns to the first turning posture, the engaging surface 70A abuts against the engaged surface portion 71 in this process, and pushes this counter-clockwise against the urging force of the spring 68. As a result, the cleaning mechanism 60 is disposed in the retracted position RP. In this retracted position RP, the wiping section 67 is separated from the transport belt 27. Further, the position sensor 81 is turned off.

On the other hand, as illustrated in FIG. 5, when the cam member 70 turns to the second turning posture, in this process, the cleaning mechanism 60 turns clockwise until the wiping section 67 comes into contact with the transport belt 27 due to the urging force of the spring 68. As a result, the cleaning mechanism 60 is disposed in the cleaning position CP. At this cleaning position CP, the position sensor 81 is turned on.

As illustrated in FIGS. 4 and 5, the web 66 included in the cleaning section 63 has an annular shape. That is, the web 66 is endless. The web 66 is laid over the outer peripheries of the plurality of rollers 76 to 78. That is, the endless web 66 is laid over the driving roller 76, a first guide roller 77, and a second guide roller 78. The first guide roller 77 is disposed at a position slightly protruding from the support frame 62 toward the transport belt 27. The wiping section 67 is formed by winding the web 66 around a part of the outer peripheral surface of the first guide roller 77. Further, since the web 66 passes through the guide rod 79 positioned between the driving roller 76 and the first guide roller 77, a large winding angle of the web 66 with respect to the outer peripheral surface of the first guide roller 77 is secured. Further, a predetermined tension is applied to the web 66 by pulling the second guide roller 78 in the direction away from the driving roller 76 by the spring 80 illustrated in FIG. 3.

The driving roller 76 is, for example, a rubber roller. Therefore, the web 66 is less likely to slip on the outer peripheral surface of the driving roller 76. Further, the web 66 is sandwiched between the driving roller 76 and the pressing roller 82 with a predetermined nip pressure. Therefore, the web 66 is less likely to slip on the driving roller 76. As a result, when the rotation amount of the driving section 64 is controlled by the control section 15 (refer to FIG. 1), the intermittent sending amount of the web 66 is also accurately controlled.

The driving roller 76 rotates in a predetermined direction by the driving force from the driving section 64, and accordingly, the web 66 rotates in a constant sending direction WD. This sending direction WD coincides with the direction of the force received from the transport belt 27 by the wiping section 67 at the time of cleaning in the wiping section 67. The wiping section 67 that abuts against the transport belt 27 during cleaning receives a force from the transport belt 27 in the rotation direction BD. The sending direction WD is set in a direction in which the direction of the force in the rotation direction BD received from the transport belt 27 by the wiping section 67 at the time of cleaning and the sending direction of the web 66 in the wiping section 67 are the same.

As described above, the cleaning mechanism 60 includes the gears 72 to 75 that transmit the power from the driving section 64. The web 66 has a configuration in which the wiping surface 67A of the wiping section 67 is changed by being sent by receiving power from the driving section 64 via the gears 72 to 75. The sending direction WD in which the web 66 is sent coincides with the direction in which the web 66 receives the frictional force from the transport belt 27 that rotates in a state where the web 66 abuts against the transport belt 27. That is, the sending direction WD in which the web 66 is sent is the same direction as the direction of the frictional force received from the transport belt 27 during the cleaning operation by the web 66 of a part of the wiping section 67 that abuts against the transport belt 27. Therefore, the direction of the force (frictional force) received from the transport belt 27 by the wiping section 67 at the time of cleaning coincides with the direction in which the backlashes of the gears 72 to 75 are packed. As a result, even when the web 66 is sent in the sending direction WD after the wiping section 67 wipes the transport belt 27, the sending direction WD is the direction in which the backlashes of the gears 72 to 75 are packed during the cleaning operation, and thus deviation in the sending amount of the web 66 due to backlash is less likely to occur.

The sending amount of the web 66 of the present embodiment is a predetermined value in a range of, for example, 0.5 to 5 mm per feed. The predetermined value is, for example, substantially 1 mm. By sending the web 66 with this extremely short sending amount, the web 66 on the wiping surface 67A contaminated with ink by the previous wiping is changed to the new web 66. Here, when the sending direction WD is opposite to the direction of the force received from the transport belt 27, a part of the driving amount of the driving section 64 is used for packing the backlashes of the gears 72 to 75. Therefore, variation occurs in which the sending amount of the web 66 is reduced by the amount of backlash compared to the driving amount of the driving section 64. In this case, there may be a part where the contaminated wiping surface 67A is not changed to the new web 66. Alternatively, waste occurs in which a large sending amount is set in anticipation of the backlash amount to completely change to the new wiping surface 67A of the web 66. In addition, the sending amount of the web 66 at one time may exceed 5 mm.

In the present embodiment, the transport belt 27 is cleaned by rotating the transport belt 27 in the rotation direction BD in a state where the wiping section 67 is in contact with the surface of the transport belt 27. When the transport belt 27 ends rotating by a predetermined rotation amount from the start of cleaning, the wiping section 67 is contaminated with the ink wiped off from the transport belt 27. The control section 15 changes the wiping surface 67A to the new web 66 by intermittently sending the web 66 by the sending amount for one time at a timing when the wiping section 67 is considered to be contaminated to a certain level or more.

The timing of the intermittent sending in which the web 66 is sent by the sending amount for one time during cleaning may be managed by the rotation amount of the transport belt 27 or may be managed by the rotation time of the transport belt 27. Further, the timing of the intermittent sending in which the web 66 is sent for one time during cleaning may be changed according to the amount of ink estimated to adhere to the transport belt 27. Furthermore, the rotation speed of the transport belt 27 during cleaning may be changed according to the amount of ink estimated to adhere to the transport belt 27. These controls are performed by the control section 15 driving and controlling the driving section 64 and the transport belt 27 during cleaning. Details of the control content of the control section 15 will be described later.

As illustrated in FIG. 5, in the transport belt mechanism 30, at a position facing the wiping section 67 with the transport belt 27 pinched therebetween, a reception section 46 is in a state of pushing the transport belt 27 outward (toward the wiping section 67) by a spring 47. In a state where the wiping section 67 abuts against the transport belt 27, the wiping section 67 pushes the transport belt 27, but the reception section 46 receives the pushing force from the side opposite to the transport belt 27 by the urging force of the spring 47. Therefore, a predetermined contact pressure is secured when the wiping section 67 abuts against the surface of the transport belt 27.

The transport belt 27 is a water-repellent belt. That is, a water-repellent layer is formed on the surface of the transport belt 27 by a water-repellent finish. Since the surface of the transport belt 27 has water repellency, it is easy to remove ink contamination from the transport belt 27. The transport belt 27 is not limited to a water-repellent belt.

Regarding Web 66

The web 66 is made of a material having a property of absorbing a liquid such as ink. The web 66 is, for example, a cloth. The web 66 may be made of a non-woven fabric, paper, a porous synthetic resin material, or the like, in addition to the cloth. The web 66 may be formed of an endless (annular) tape made of a material having a property of absorbing a liquid. Here, the total length of the web 66 has a margin slightly larger than the product of the frequency of jams occurring on the transport surface 40 (total estimated number of times of occurrences) and the average length of the web 66 consumed by cleaning one jam.

Regarding Jam

Among the jams that occur on the transport path 36 and the inversion path 37, the jam that occurs on the transport surface 40 of the transport belt 27 has an extremely low frequency. Here, the jam generated on the transport surface 40 is referred to as the first jam, and is distinguished from the second jam which is a jam other than this. The first jam is detected when the second detection section 42 does not detect the medium 17, even though the medium 17 detected by the first detection section 41 is transported with a predetermined transport amount which is a sufficient length required until the medium 17 is detected by the second detection section 42.

Therefore, when the first jam occurs, the medium 17 may not be present on the transport surface 40. In this state, when the discharge section 19 discharges the liquid from the nozzle 20, the discharged liquid lands on the surface of the transport belt 27. That is, the surface of the transport belt 27 is contaminated with a liquid such as ink due to erroneous discharge. When the user starts the next printing while the transport belt 27 is contaminated with the liquid after the first jam is cleared, the liquid such as ink on the transport belt 27 is transferred to the medium 17, and the medium 17 is contaminated with the liquid such as ink. In this case, since the printed medium 17 is a defective product, the user needs to clean the transport belt 27 and then perform the printing again.

In the present embodiment, in order to reduce or clear this type of printing failure, the cleaning mechanism 60 cleans the transport belt 27 after the first jam is detected and before the next printing is started. Therefore, in the next printing started after the first jam, a printing failure due to ink contamination on the transport belt 27 is avoided.

Configuration of Detection Section 83

Next, the configuration of the detection section 83 that measures the sending amount of the web 66 will be described with reference to FIGS. 3, 6, and 7.

As illustrated in FIG. 3, the cleaning mechanism 60 includes the detection section 83 that measures the rotation amount of the driving section 64. The detection section 83 includes the rotary type detected section 84 fixed to the end portion of the rotation shaft 76A of the driving roller 76, and the sensor 85 that detects the detected section 84.

Figure 6:
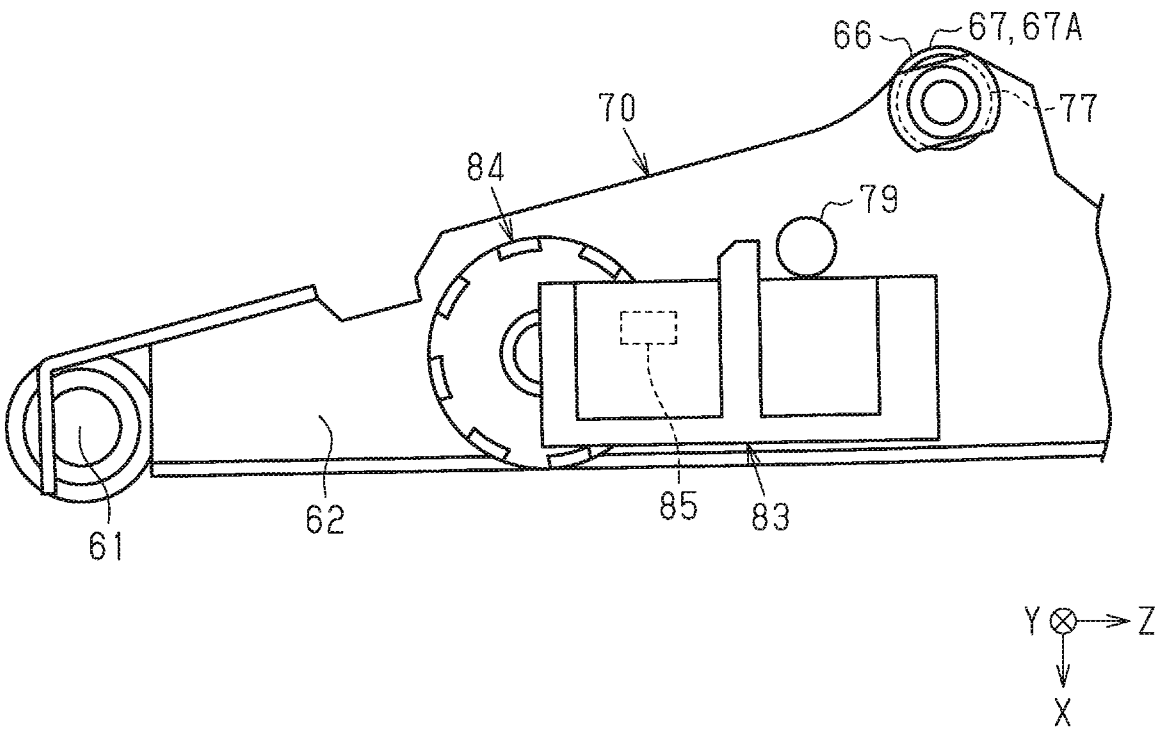
FIG. 6 is a schematic rear view illustrating a detection section in the cleaning mechanism.
Figure 7:
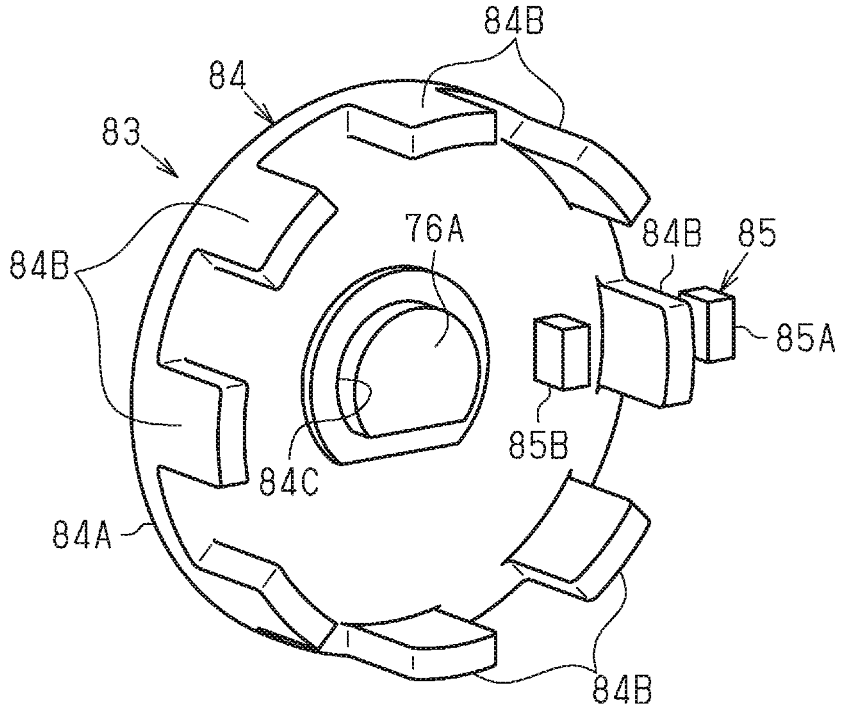
FIG. 7 is a schematic perspective view illustrating the detection section.

As illustrated in FIGS. 6 and 7, the detection section 83 includes a plurality of detected sections 84B provided at intervals in the peripheral direction of a disk 84A that rotates integrally with the rotation shaft 76A of the driving section 64, and the sensor 85 for sequentially detecting the plurality of detected sections 84B. The detected section 84 includes the disk 84A and the plurality of detected sections 84B intermittently disposed on the outer peripheral portion of the disk 84A at a constant pitch in the peripheral direction. As illustrated in FIG. 7, the disk 84A is provided with an insertion hole 84C in a center portion. The rotation shaft 76A of the driving roller 76 is fitted into the insertion hole 84C in a state of being prevented from rotating. The disk 84A rotates as the rotation shaft 76A rotates. The plurality of detected sections 84B are bent at substantially right angles from the outer peripheral portion of the disk 84A in a direction parallel to the axis of the insertion hole 84C.

The sensor 85 includes, for example, a light emission section 85A and a light reception section 85B. The sensor 85 may be configured by, for example, a photo interrupter. The light emission section 85A and the light reception section 85B constituting the sensor 85 are disposed facing the disk 84A on both sides in the radial direction pinching the rotation locus of the detected section 84B.

As illustrated in FIG. 7, the detected section 84 has, for example, three or more detected sections 84B. As long as the number of the detected sections 84B is three or more, the number of the detected sections 84B may be four, five, or six or more. In the example illustrated in FIG. 7, the detected section 84 has eight detected sections 84B. Here, assuming that the number of the detected sections 84B included in the detected section 84 is M, the sending amount of the web 66 can be measured with a resolution M times that of the case where the number of the detected sections 84B is one. Since the web 66 is intermittently sent in this manner, the sending amount at one time is only a small amount required for the web 66 of the wiping section 67 to be changed to a new surface. Therefore, the detection section 83 is configured to obtain a resolution required for measuring a small sending amount of the web 66 at one time.

Electric Configuration of Liquid Discharge Apparatus 11

Next, the electric configuration of the liquid discharge apparatus 11 will be described with reference to FIG. 8.

Figure 8:
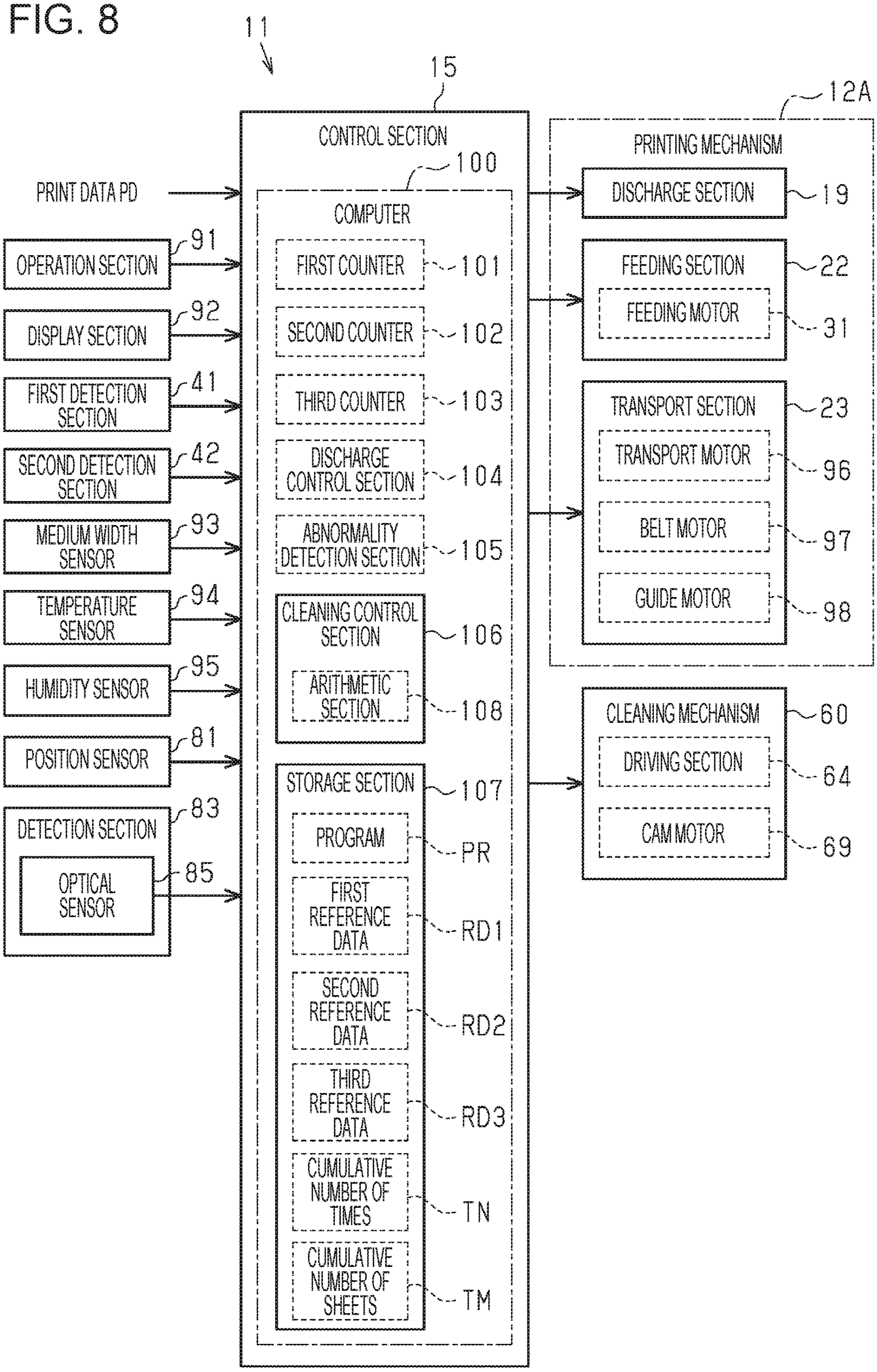
FIG. 8 is a block diagram illustrating an electric configuration of the liquid discharge apparatus.

As illustrated in FIG. 8, the liquid discharge apparatus 11 includes the above-described control section 15. The control section 15 inputs print data PD. The control section 15 drives and controls a printing mechanism 12A based on the print data PD to perform printing on the medium 17. The print data PD includes a print command, print condition information, and image data. The print condition information includes a type, a size, a color/monochrome print mode, and the like of the medium. The image data is dot data. The amount of ink discharged from the nozzle 20 of the discharge section 19 is determined by the dot information of the image data. The size of the ink droplet may be divided into a plurality of stages. For example, the size of the ink droplet may be two types of large and small types, three types of large, medium, and small types, and a plurality of types of four or more types. When the large dot ink droplets are discharged from all the nozzles 20 of the discharge section 19, the printing duty is 100%. When the printing duty value is 100%, the amount of ink discharged is the maximum amount. As the printing duty value becomes smaller, the amount of ink discharged from the discharge section 19 becomes smaller.

As an input system, the operation section 91, the display section 92, the first detection section 41, the second detection section 42, a medium width sensor 93, a temperature sensor 94, a humidity sensor 95, the position sensor 81, and the detection section 83 are electrically coupled to the control section 15. The detection section 83 includes an optical sensor 85.

As an output system, the discharge section 19, the feeding section 22, the transport section 23, and the cleaning mechanism 60 are electrically coupled to the control section 15. Specifically, the feeding motor 31 constituting the feeding section 22, and the transport motor 96, the belt motor 97, and the guide motor 98 constituting the transport section 23 are electrically coupled to the control section 15. Furthermore, the driving section 64 and the cam motor 69 constituting the cleaning mechanism 60 are electrically coupled to the control section 15.

The control section 15 includes a computer 100. The computer 100 includes a first counter 101, a second counter 102, and a third counter 103. Furthermore, the computer 100 includes a discharge control section 104, an abnormality detection section 105, a cleaning control section 106, and a storage section 107. The cleaning control section 106 includes an arithmetic section 108. Further, the storage section 107 stores information such as program PR, first reference data RD1, second reference data RD2, third reference data RD3, cumulative number of times TN, and cumulative number of sheets TM. The program PR includes a cleaning control routine illustrated in the flow chart of FIG. 14.

The discharge control section 104, the abnormality detection section 105, and the cleaning control section 106 may include software constructed by executing the program PR by the computer 100, hardware including an electronic circuit such as ASIC, and further, combination of software and hardware. In the present embodiment, the discharge control section 104, the abnormality detection section 105, and the cleaning control section 106 include software in at least a part thereof.

The first counter 101 counts a value indicating a position of the medium 17 on the transport path. For example, when the tip end of the medium 17 is detected by the first detection section 41, the first counter 101 is reset, and then the number of input pulses or the number of pulse edges from a rotary encoder (not illustrated) that detects the rotation of the transport motor 96 is counted. The counted value of the first counter 101 indicates a position of the medium 17 on the transport path. The control section 15 recognizes the position of the medium 17 on the transport path from the counted value of the first counter 101.

The second counter 102 counts the cumulative number of sheets of the medium 17. For example, the second counter 102 counts the cumulative number of sheets by counting the number of times the second detection section 42 detects the rear end of the medium 17.

The third counter 103 counts the cumulative number of times of intermittent sending of the web 66 performed by the cleaning mechanism 60. A total length WL, which is the length of one round of the web 66, is a length obtained by multiplying the intermittent sending amount F for one time, the estimated number of times J of the first jam that can occur during the useful life of the liquid discharge apparatus 11, and the average number of times P of intermittent web sending per first jam, and adding a predetermined margin ΔL to the value obtained by multiplication. That is, the total length WL of the web 66 is set to $WL=F*J*P+\Delta L$. Therefore, the counted value of the third counter 103 does not reach the value corresponding to the total length of the web 66 even when the liquid discharge apparatus 11 reaches the useful life.

The discharge control section 104 controls the discharge section 19. Specifically, the discharge control section 104 controls the discharge section 19 based on the image data included in the print data PD. The discharge control section 104 controls the size (amount) of droplets discharged from the nozzle 20 of the discharge section 19 with a duty value based on a pixel value of image data.

The computer 100 calculates the printing duty value using the duty value or image data used by the discharge control section 104 for the discharge control. Here, the printing duty value is a value corresponding to the amount of liquid discharged by the discharge section 19 per unit area of the medium 17. Further, the printing duty value is also defined as an amount of liquid discharged by the discharge section 19 per unit time, that is, an average discharge amount of the discharge section 19 per unit time, assuming that the transport speed of the medium 17 is constant. For example, when droplets of maximum size are discharged from all the nozzles 20 of the discharge section 19, the printing duty value is set to 100%. The printing duty value is proportional to the product of the number of nozzles discharging droplets among all the nozzles 20 of the discharge section 19 and the size of the droplets discharged from each of the nozzles 20. The printing duty value corresponds to an example of information on the amount of liquid discharged from the discharge section 19 toward the medium 17.

The abnormality detection section 105 detects an abnormality such as a jam in which the medium 17 is clogged on the transport path. The jam includes a first jam generated on the transport belt 27. The first jam is a jam in which the medium 17 that should be present on the transport belt 27 is clogged while being transported to a regular position on the transport belt 27. The abnormality detection section 105 detects the first jam when the second detection section 42 does not detect the medium 17, even though the medium 17 detected by the first detection section 41 is transported with a predetermined transport amount which is a sufficient length required until the medium 17 is detected by the second detection section 42.

When the first jam occurs, even when the control section 15 detects the abnormality and stops the discharge, since there is an amount instructed before the suspension, the discharge section 19 discharges the liquid such as ink onto the transport surface 40 of the transport belt 27 where the medium 17 is not present. Therefore, when the computer 100 receives the operation signal indicating that the first jam is cleared, the computer 100 instructs the cleaning mechanism 60 to clean the transport belt 27 contaminated with a liquid such as ink.

The cleaning control section 106 controls the cleaning mechanism 60. When the abnormality detection section 105 detects the first jam, the cleaning control section 106 causes the cleaning mechanism 60 to perform cleaning of the transport belt 27. The cleaning control section 106 controls the driving section 64 and the cam motor 69 to cause the cleaning mechanism 60 to perform a series of cleaning operations. The cleaning control section 106 includes an arithmetic section 108 for performing various arithmetic operations. The details of the series of cleaning operations will be described later.

The control section 15 acquires information on the amount of liquid discharged from the discharge section 19 toward the medium 17. The control section 15 determines the predetermined number of times M1 based on this information. Further, when the amount of the liquid is the first amount, the control section 15 sets a predetermined number of times as the first number of times m1. Further, when the amount of the liquid is a second amount less than the first amount, the control section 15 sets the predetermined number of times as the second number of times m2 less than the first number of times m1.

In the present embodiment, the printing duty value is used as information on the amount of liquid discharged from the discharge section 19 toward the medium 17. The control section 15 sets the predetermined number of times M1 according to the printing duty value. As described above, the printing duty value refers to the discharge amount per unit area of the medium 17 or the discharge amount per unit time. When the printing duty value is the first printing duty value, the control section 15 sets the predetermined number of times M1 as the first number of times m1. Further, when the printing duty value is the second printing duty value of discharging the second amount of the liquid less than the first amount, the control section 15 sets the predetermined number of times M1 as the second number of times m2 less than the first number of times m1.

Figures 9, 10:
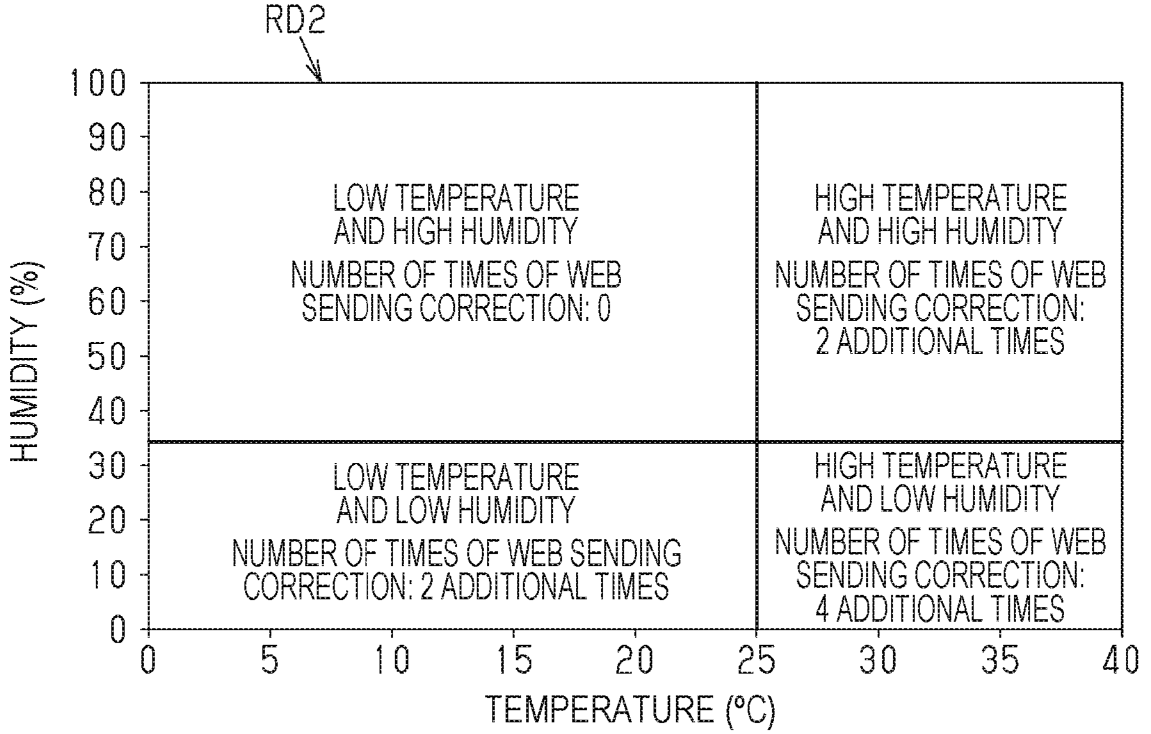
FIG. 9 is a schematic diagram illustrating first reference data.
FIG. 10 is a schematic diagram illustrating second reference data.

The control section 15 may determine the predetermined number of times M1 indicating the number of times of web sending according to the printing duty value by referring to the first reference data RD1 illustrated in FIG. 9 based on the printing duty value.

The first reference data RD1 illustrated in FIG. 9 is table data illustrating a correspondence relationship between the printing duty value and the number of times of web sending (the number of times of intermittent sending). In the example illustrated in FIG. 9, when the printing duty value is 0 to 10%, the number of times of web sending is set to 1, when the printing duty value is 11 to 30%, the number of times of web sending is set to 3, when the printing duty value is 31 to 60%, the number of times of web sending is set to 6, and when the printing duty value is 61% or greater, the number of times of web sending is set to 10. FIG. 9 is an example, and the printing duty value may be divided into other ranges and other values may be set as the number of times of web sending in each range. As illustrated in FIG. 9, the number of divisions of the range in the first reference data RD1 is not limited to four stages, and may be a plurality of stages of two stages, three stages, five stages, and six or more stages. For example, in the first reference data RD1, the printing duty value may be divided into 10 stages by dividing by 10%, and the number of times of web sending may be set to 1 to 10 in order from the smaller range. Further, for example, the printing duty value may be divided into 2 stages of 0 to 50% and 51 to 100%, and the number of times of web sending may be set to 1 or 2 in order from the smaller range.

In addition, the control section 15 may acquire information on at least one of humidity and temperature in the apparatus main body 12. The control section 15 may determine a predetermined number of times based on information on at least one of humidity and temperature. In the present embodiment, the predetermined number of times M1 set according to the printing duty value is corrected based on at least one of humidity and temperature. The control section 15 acquires temperature information from the temperature sensor 94 and humidity information from the humidity sensor 95. In the present embodiment, the control section 15 determines the predetermined number of times based on, for example, information on humidity and temperature. The control section 15 may set a predetermined number of times according to the information on at least one of the humidity and the temperature, and may correct the predetermined number of times according to the printing duty value.

The control section 15 may determine the predetermined number of times M2 indicating the number of times of web sending according to the combination of humidity and temperature by referring to the second reference data RD2 illustrated in FIG. 10 based on the information on humidity and temperature. In the example illustrated in FIG. 10, the number of times of web sending correction is set in the second reference data RD2 according to the combination of humidity and temperature. The control section 15 determines the predetermined number of times M2 by correcting the predetermined number of times M1 determined based on the printing duty value with the number of times of web sending correction corresponding to the combination of humidity and temperature.

Further, the control section 15 acquires information on the cumulative number of sheets TM of the medium transported by the transport belt 27. The control section 15 determines a predetermined number of times based on this information. The predetermined number of times when the cumulative number of sheets TM of the medium is the first number of sheets TM1 is greater than the predetermined number of times when the cumulative number of sheets TM of the medium 17 is the second number of sheets TM2 less than the first number of sheets TM1. That is, when the cumulative number of sheets TM of the medium 17 is the first number of sheets TM1, the control section 15 sets the predetermined number of times as the first number of times m1, and when the cumulative number of sheets TM of the medium 17 is the second number of sheets TM2 less than the first number of sheets TM1, the control section 15 sets the predetermined number of times as the second number of times m2 less than the first number of times m1. The control section 15 acquires information on the cumulative number of sheets TM used for determining the predetermined number of times from the counted value of the second counter 102 or the storage section 107.

Figure 11:
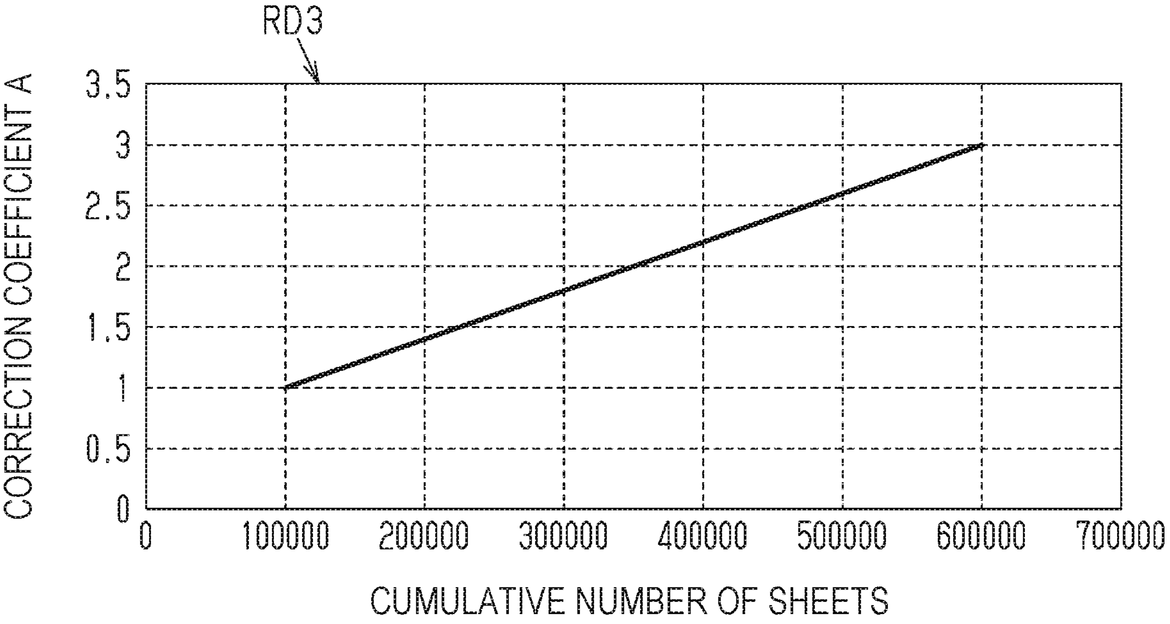
FIG. 11 is a schematic diagram illustrating third reference data.

The control section 15 acquires a correction coefficient A corresponding to the cumulative number of sheets TM by referring to the third reference data RD3 illustrated in FIG. 11 based on the information on the cumulative number of sheets TM of the medium. The control section 15 determines the predetermined number of times M3 by multiplying the predetermined number of times M2 corrected according to the combination of humidity and temperature by the correction coefficient A. The predetermined number of times M3 may be determined based on one or two of the cumulative number of sheets TM, which is at least one of the printing duty value, the humidity, and the temperature.

Further, the control section 15 causes the transport belt 27 to rotate at a first speed V1 from the start of cleaning to a predetermined time, and after the predetermined time, the control section 15 causes the transport belt 27 to rotate at a second speed V2 faster than the first speed V1.

For example, the rotation speed of the transport belt 27 may be switched from low speed to high speed after one or two intermittent drives (intermittent web sending). Further, for example, when the intermittent drive is performed one time, the rotation is performed at the first speed V1 (low speed) for a predetermined time by the one intermittent drive. After that, the transport belt 27 may be rotated at the second speed V2 (high speed) faster than the first speed V1.

Further, for example, when the intermittent driving is performed twice, the rotation is performed at the first speed V1 for the first time after the first intermittent drive. Next, after the second intermittent drive, the rotation is performed at the first speed V1 for the second time. In this case, the total time of the first time and the second time corresponds to a predetermined time. Then, the transport belt 27 may be rotated at the first speed V1 during these predetermined times from the start of cleaning, and the transport belt 27 may be rotated at the second speed V2 (high speed) after the predetermined time.

The medium width sensor 93 measures the width of the medium 17. The control section 15 acquires information on the width of the medium 17 based on the detection signal from the medium width sensor 93. By measuring the width of the medium 17, the control section 15 determines whether or not the width of the actually transported medium 17 coincides with the medium size designated by the print condition information. Further, the control section 15 detects a deviation of the medium 17 in the width direction Y based on the detection signal of the medium width sensor 93, and adjusts the discharge position of the liquid in the width direction Y according to the deviation position.

Further, the control section 15 may specify a region in the width direction Y to which a liquid such as ink adheres on the surface of the transport belt 27 when the first jam occurs, based on the information on the width from the medium width sensor 93. By specifying the ink adhering region in the width direction Y, the amount of ink to be wiped off by the wiping section 67 can be estimated. Therefore, the control section 15 may determine the number of times of sending the web 66, that is, the predetermined number of times M1, based on the information of the width region where the ink specified from the width information of the medium 17 detected by the medium width sensor 93 is estimated to adhere, in addition to the printing duty value. Instead of the information on the width from the medium width sensor 93, the number of times of sending the web 66, that is, the predetermined number of times M1, may be determined based on the width region specified from the information on the medium size included in the print condition information.

Operation

Next, the operation of the liquid discharge apparatus 11 will be described. The cleaning operation of cleaning the transport belt 27 in the liquid discharge apparatus 11 will be mainly described with reference to FIG. 14.

Figure 14:
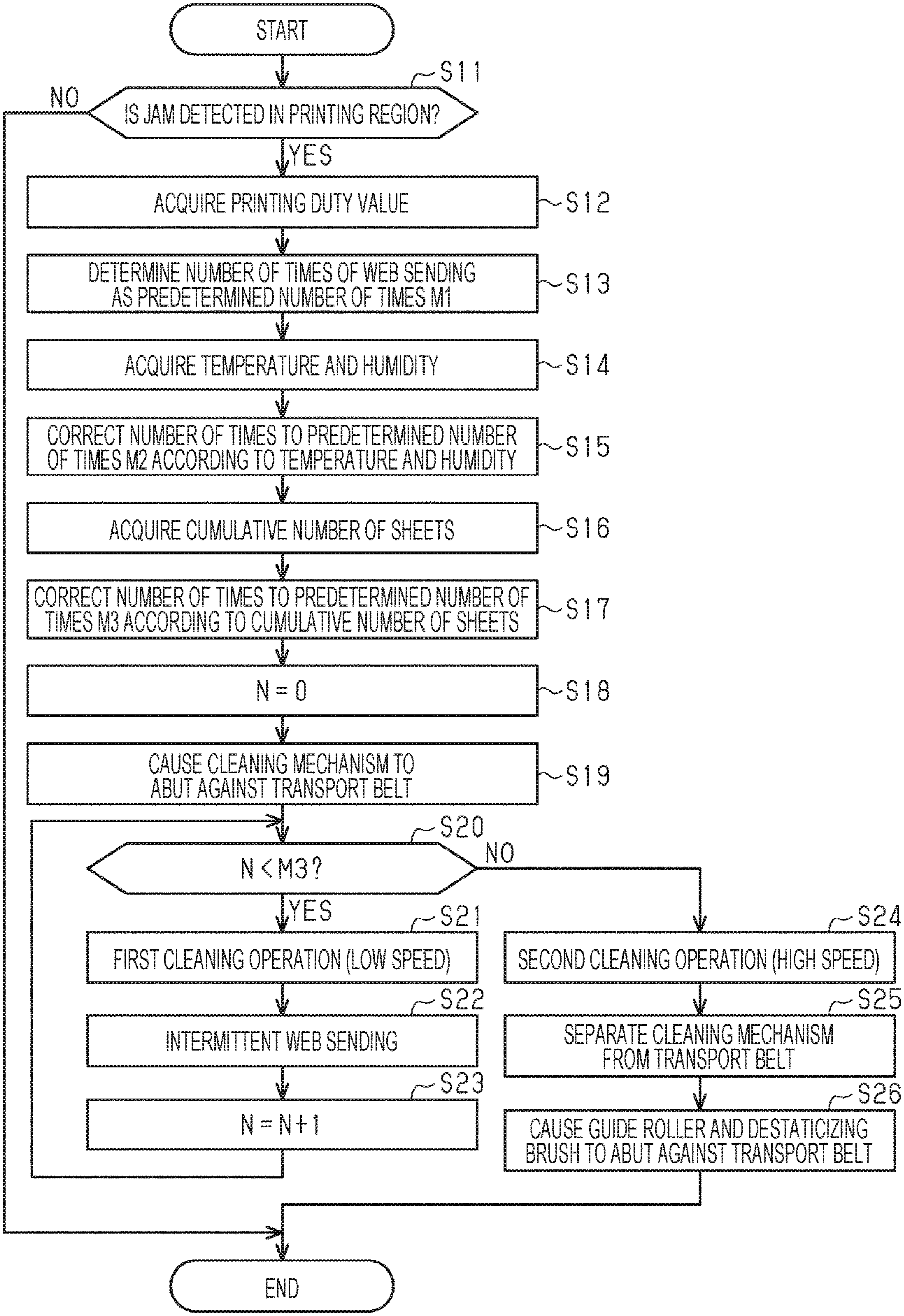
FIG. 14 is a flow chart illustrating a cleaning control routine.

Hereinafter, the computer 100 in the control section 15 drives and controls the transport belt mechanism 30 and the cleaning mechanism 60 by executing the program PR of the cleaning control routine illustrated in the flow chart of FIG. 14. Hereinafter, the cleaning control executed by the computer 100 will be described.

First, in step S11, the computer 100 determines whether or not jam is detected in the printing region. When the medium 17 is not detected by the second detection section 42 even though the first detection section 41 detects the medium 17 and then performs the transport operation of a predetermined transport amount, the control section 15 recognizes that a first jam, which is a jam in which the medium 17 is clogged on the transport surface 40 of the transport belt 27, that is, in the printing region, has occurred. When jam is detected in the printing region, the process proceeds to step S12, and when jam is not detected in the printing region, the routine is ended.

In the next step S12, the computer 100 acquires a printing duty value. The computer 100 calculates the printing duty value based on the image data in the print data PD. The printing duty value is a value proportional to the amount of ink erroneously discharged toward the transport belt 27 when the first jam occurs. That is, the printing duty value is used for estimating the amount of ink adhering to the transport belt 27 to be cleaned.

In step S13, the computer 100 determines the number of times of web sending which is set to be as the predetermined number of times M1. Specifically, the computer 100 determines the predetermined number of times M1 according to the printing duty by referring to the first reference data RD1 based on the printing duty value. As illustrated in FIG. 9, for example, when the printing duty value is a value in the range of 31 to 60%, the number of times of web sending is determined to be "6".

In the next step S14, the computer 100 acquires the temperature and humidity. That is, the computer 100 acquires information on temperature and humidity based on the detection signals input from the temperature sensor 94 and the humidity sensor 95. This information represents the temperature and humidity inside the apparatus main body 12 or around the apparatus main body 12. The temperature and humidity affect the viscosity of the ink adhering to the transport belt 27.

In step S15, the computer 100 corrects the predetermined number of times M1 to the predetermined number of times M2 according to the temperature and humidity. Specifically, the computer 100 acquires the number of times of web sending correction corresponding to the combination of temperature and humidity with reference to the second reference data RD2 illustrated in FIG. 10, based on the combination of temperature and humidity. Further, the computer 100 determines the predetermined number of times M2 by correcting the previously determined predetermined number of times M1 by the number of times of web sending correction. As illustrated in FIG. 10, when the acquired temperature and humidity are within the range of, for example, "high temperature and high humidity" or "low temperature and low humidity", the number of times of web sending correction is "2 additional times", and thus, the number of times of web sending correction is corrected to the predetermined number of times M2 (=M1+2) by adding "2" to the predetermined number of times M1. In addition, when the acquired temperature and humidity are within the range of, for example, "high temperature and low humidity", the number of times of web sending correction is "4 additional times", and thus, the number of times of web sending correction is corrected to the predetermined number of times M2 (=M1+4) by adding "4" to the predetermined number of times M1. When the acquired temperature and humidity are within the range of the combination of low temperature and high humidity including normal temperature, the predetermined number of times M1 is not corrected (M2=M1).

In step S16, the computer 100 acquires the cumulative number of sheets. The computer 100 counts the cumulative number of sheets TM of the printed medium 17 in the second counter 102, and stores the information of the cumulative number of sheets TM in the storage section 107. The computer 100 acquires information on the cumulative number of sheets TM from the counted value of the second counter 102 or the storage section 107.

In step S17, the computer 100 corrects the predetermined number of times M2 to the predetermined number of times M3 according to the cumulative number of sheets. Specifically, the computer 100 acquires the correction coefficient A corresponding to the cumulative number of sheets TM by referring to the third reference data RD3 illustrated in FIG. 11 based on the cumulative number of sheets TM. Further, the computer 100 determines the predetermined number of times M3 by multiplying the predetermined number of times M2 by the correction coefficient A. In this manner, the predetermined number of times M3 is determined as the number of times of web sending at the time of cleaning. In the following steps S18 to S26, the computer 100 performs the cleaning operation under the condition of the number of times of web sending M3.

In step S18, the computer 100 resets the third counter 103 that counts the number of times of web sending N (N=0).

In the next step S19, the computer 100 causes the cleaning mechanism 60 to abut against the transport belt 27. That is, the computer 100 moves the cleaning mechanism 60 from the retracted position RP illustrated in FIGS. 2 and 4 to the cleaning position CP illustrated in FIG. 5 around the turning shaft 61 by driving the cam motor 69 and rotating the cam member 70 from the first turning posture illustrated in FIG. 4 to the second turning posture illustrated in FIG. 5. At this cleaning position CP, the wiping section 67 abuts against the transport belt 27. At this time, the wiping section 67 abuts against the surface of the transport belt 27 with a predetermined contact pressure due to the elastic force of the spring 68 urging the cleaning mechanism 60. Further, since the wiping section 67 abuts against the part of the transport belt 27 facing the reception section 46, a decrease in the contact pressure due to the bending of the transport belt 27 is suppressed.

In step S20, the computer 100 determines whether or not the number of times of web sending N is less than the predetermined number of times M3 (N<M3). When N<M3, the process proceeds to step S21, and when N<M3 is not satisfied (that is, when N≥M3), the process proceeds to step S24.

In step S21, the computer 100 performs the first cleaning operation. That is, the computer 100 performs low-speed cleaning. Specifically, the computer 100 causes the transport belt 27 to rotate at a low speed at the first speed V1 by driving the belt motor 97 at a low speed under a state where the wiping section 67 abuts against the transport belt 27 (refer to FIG. 12). The computer 100 causes the transport belt 27 to rotate by a previously determined predetermined rotation amount, and performs one first cleaning operation. Here, one cleaning operation may be performed by rotating the transport belt 27 less than once, or by rotating the transport belt 27 once or more. In this example, one cleaning operation is based on one or more rotations of the transport belt 27. The computer 100 may rotate the transport belt 27, for example, a plurality of times during one cleaning operation. The computer 100 performs one low-speed cleaning operation by, for example, rotating the transport belt 27 at a low speed with a predetermined rotation amount within a range of 1 to 5 rounds.

In step S22, the computer 100 performs intermittent web sending (intermittent drive). That is, when one first cleaning operation is completed, the computer 100 intermittently drives the driving section 64 by a predetermined driving amount. In this example, the predetermined sending amount at the time of intermittent web sending is a driving amount for the web 66 of the wiping section 67 to be changed to a new surface. The predetermined sending amount is, for example, a predetermined value (for example, 1 mm) in the range of 0.5 to 5 mm.

In step S23, the computer 100 increments the number of times of web sending N (N=N+1). That is, the computer 100 adds "1" to the counted value of the third counter 103. After that, the computer 100 returns to the process of step S20.

In this manner, the processes of steps S21 to S23 are repeatedly executed until the number of times of web sending N reaches the predetermined number of times M3 (negative determination) in step S20, and accordingly, the first cleaning operation, which is low-speed cleaning, is performed the predetermined number of times M3. The intermittent web sending is performed each time the first cleaning operation is performed, at this time, the transport belt 27 continues to rotate at a low speed. That is, the intermittent web sending is performed under a state where the low-speed rotation is continued without stopping the rotation of the transport belt 27. The first cleaning operation may be performed one time. Further, the rotation of the transport belt 27 may be temporarily stopped at the time of intermittent web sending.

Then, when the number of times of web sending reaches the predetermined number of times M3 in step S20, the computer 100 performs the second cleaning operation in step S24. That is, the computer 100 performs high-speed cleaning. Specifically, the computer 100 causes the transport belt 27 to rotate at a high speed at the second speed V2 by driving the belt motor 97 at a high speed under a state where the wiping section 67 abuts against the transport belt 27 (refer to FIG. 13). The computer 100 causes the transport belt 27 to rotate by a previously determined predetermined rotation amount, and performs one second cleaning operation. Here, the one second cleaning operation is performed by the operation of the transport belt 27 for one rotation or more, but may be performed by the operation of the transport belt 27 for less than one rotation. The computer 100 causes the transport belt 27 to rotate, for example, a plurality of times during one second cleaning operation. The computer 100 performs the second cleaning operation, which is high-speed cleaning, while rotating the transport belt 27 at a predetermined rotation amount within a range of, for example, 1 to 5 rounds. The second cleaning operation corresponds to finish cleaning. By performing the finish cleaning at a high speed, the time required for cleaning can be shortened. The predetermined rotation amount of the transport belt 27 during high-speed cleaning may be the same as or greater than the predetermined rotation amount of the transport belt 27 during low-speed cleaning.

In step S25, the computer 100 separates the cleaning mechanism 60 from the transport belt 27. That is, the computer 100 drives the cam motor 69 to rotate the cam member 70 from the second turning posture illustrated in FIG. 5 to the first turning posture illustrated in FIG. 4. As a result, when the engaging surface 70A of the cam member 70 pushes the engaged surface portion 71, the cleaning mechanism 60 retracts from the cleaning position CP illustrated in FIG. 5 to the retracted position RP illustrated in FIG. 4. By this retracting operation, the wiping section 67 is separated from the transport belt 27.

In step S26, the computer 100 drives the guide motor 98 to cause the guide roller 45 and the destaticizing brush 55 to abut against the transport belt 27. In this manner, when the cleaning is completed, the guide roller 45 and the destaticizing brush 55 are prepared in a printable state where the guide roller 45 and the destaticizing brush 55 abut against the transport belt 27.

A control method in which the control section 15 controls the liquid discharge apparatus 11 by the above cleaning control will be described. As described above, the liquid discharge apparatus 11 includes the discharge section 19, the transport belt 27, the web 66, and the driving section 64. The control method of the liquid discharge apparatus 11 includes a first step of changing the wiping surface 67A of the web 66 that abuts against the transport belt 27. Within the cleaning period for cleaning the transport belt 27, the first step is performed a predetermined number of times. In FIG. 14, the intermittent web sending step in step S22 corresponds to an example of the first step.

Next, a cleaning operation in which the cleaning mechanism 60 cleans the transport belt 27 will be described. The cleaning operation includes the first cleaning operation illustrated in FIG. 12 and the second cleaning operation illustrated in FIG. 13. When the predetermined number of times M3, which is the number of times of web sending, is determined, the transport belt 27, the cleaning mechanism 60, and the like are controlled by the control section 15, and thus the cleaning operation is started.

Figure 12:
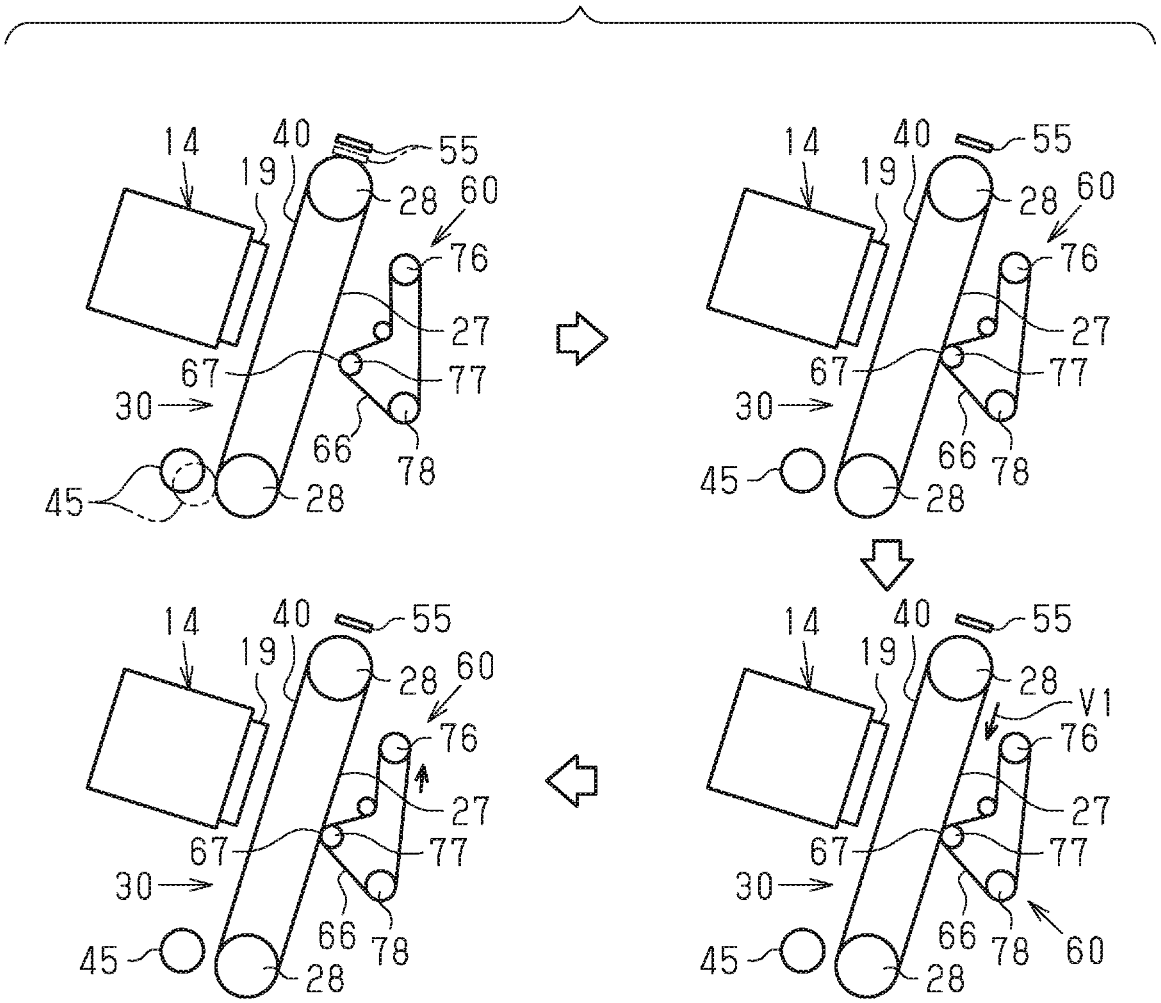
FIG. 12 is a schematic front view illustrating a procedure of a first cleaning operation.

First, the first cleaning operation, which is the low-speed cleaning illustrated in FIG. 12, is performed. First, the guide roller 45 and the destaticizing brush 55 are separated from the transport belt 27 (upper left diagram of FIG. 12). Next, the wiping section 67 of the cleaning mechanism 60 abuts against the transport belt 27 (upper right diagram of FIG. 12). In this state, the transport belt 27 rotates at a low speed, and the ink adhering to the surface of the transport belt 27 is wiped off at a low speed by the wiping section 67 (lower right diagram of FIG. 12). For example, immediately after the jam occurs, a large amount of ink discharged from the discharge section 19 adheres to the surface of the transport belt 27. The ink that first adheres to the surface of the transport belt 27 is wiped off at a low speed. Therefore, the ink is efficiently wiped off while being absorbed by the web 66 of the wiping section 67. That is, the ink is efficiently absorbed by the web 66 by wiping at a low speed.

Each time one first cleaning operation (low-speed cleaning) is ended, the web 66 is intermittently sent by a predetermined sending amount (for example, 1 mm) (lower left diagram in FIG. 12). As a result, the web 66 of the wiping section 67 is changed to a new surface.

Further, when the amount of ink is large, the ink may not be sufficiently wiped off by one low-speed cleaning operation. For example, when the printing duty value is large, the amount of ink discharged from the discharge section 19 is large, and thus, the amount of ink adhering to the surface of the transport belt 27 when the first jam occurs is large. In this case, even when the web 66 of the wiping section 67 has a new surface, the ink cannot be completely absorbed by one low-speed cleaning operation. Therefore, a predetermined number of times, which is the number of times of the low-speed cleaning operation, is set to a large value according to the printing duty value.

When the printing duty value is large and the amount of ink adhering to the transport belt 27 is large, the low-speed cleaning operation is performed a plurality of times. One low-speed cleaning operation and one intermittent web sending operation performed each time the operation is ended are regarded as one cycle (FIG. 12). Then, this one cycle is performed a predetermined number of times M3. As a result, even when the amount of ink adhering to the transport belt 27 is large, after sufficiently wiping off the ink from the surface of the transport belt 27, it is possible to shift to the next second cleaning operation corresponding to finishing.

The second cleaning operation, which is the next finish cleaning, is performed by high-speed cleaning. The second cleaning operation is a finish cleaning that wipes off the ink thinly remaining on the surface of the transport belt 27. The second cleaning operation is cleaning in which the surface of the transport belt 27 is rubbed and cleanly wiped off rather than absorbing ink. Therefore, in order to increase the area of rubbing the surface of the transport belt 27 within a predetermined time, the second cleaning operation is performed by high-speed cleaning. In addition, since the high-speed cleaning is performed, the total required time required for cleaning is shortened as compared with the configuration in which the second cleaning operation is performed at the same speed as the first cleaning operation.

Figure 13:
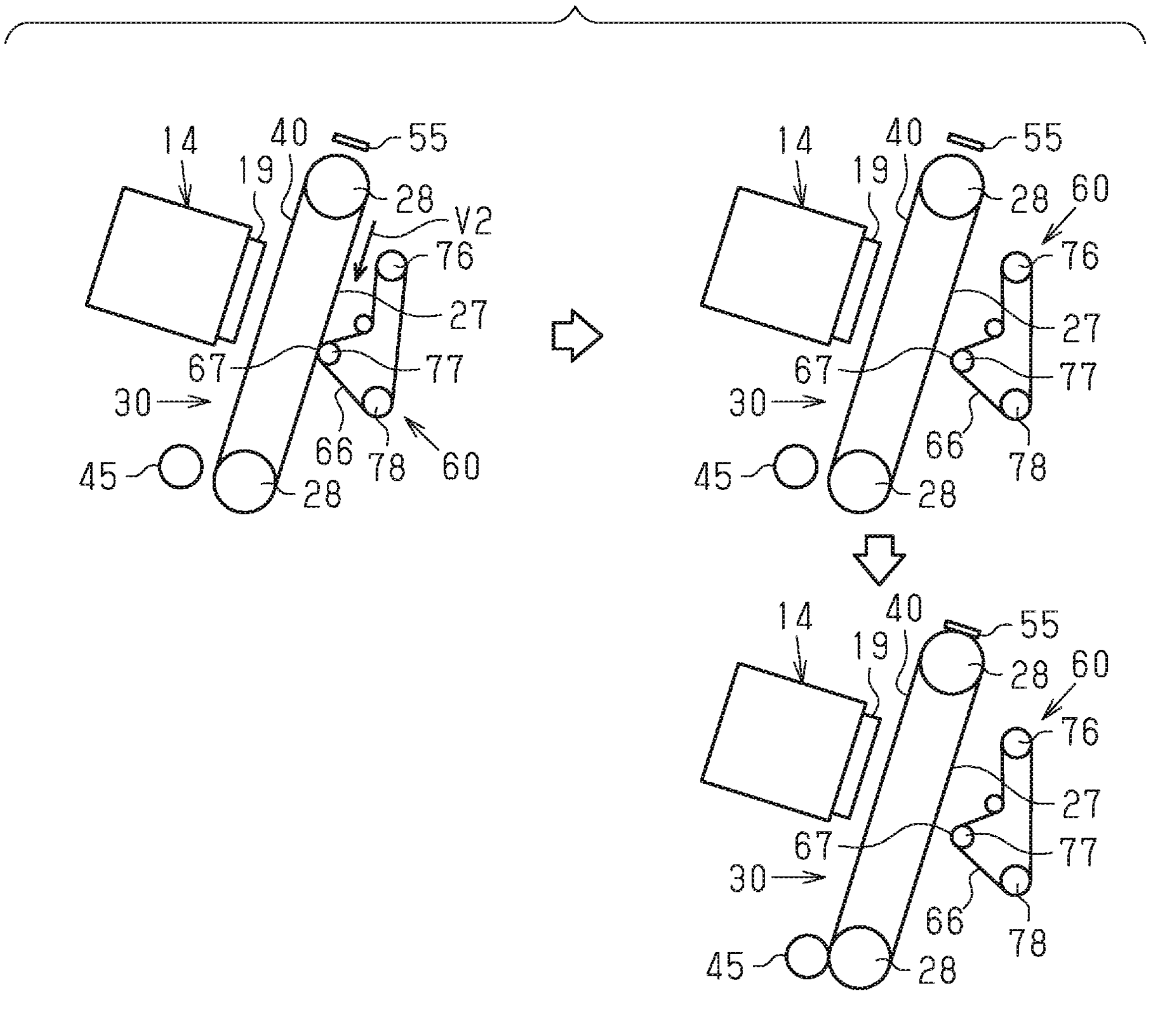
FIG. 13 is a schematic front view illustrating a procedure of a second cleaning operation.

As illustrated in FIG. 13, in the second cleaning operation, the transport belt 27 is rotated at a high speed of the second speed V2, and the surface of the transport belt 27 is cleaned at a high speed by the wiping section 67 (upper left diagram of FIG. 13). The second cleaning operation is completed only once. Next, the cleaning mechanism 60 turns from the cleaning position CP to the retracted position RP, and accordingly, the wiping section 67 is separated from the transport belt 27 (upper right diagram of FIG. 13). After that, the guide roller 45 and the destaticizing brush 55 are disposed at the operating position where the guide roller 45 and the destaticizing brush 55 abut against the transport belt 27 in preparation for the next printing (lower right diagram of FIG. 13).

Further, the content of the cleaning operation may be changed according to the viscosity of the ink. The control section 15 can predict the viscosity of the ink based on the temperature and humidity information measured by the temperature sensor 94 and the humidity sensor 95. The viscosity of the ink decreases as the temperature increases. Further, the viscosity of the ink decreases as the humidity increases. In other words, the viscosity of the ink increases as the temperature decreases. Further, the viscosity of the ink increases as the humidity decreases.

High-viscosity ink is difficult to wipe off. This is because the high-viscosity ink is less likely to be absorbed by the web 66 than the low-viscosity ink. The low-viscosity ink can be wiped off by being absorbed by the wiping section 67. However, since the high-viscosity ink is not easily absorbed by the web 66 of the wiping section 67, it is necessary to repeatedly wipe off the ink with the wiping section 67. Then, in order to wipe off the high-viscosity ink, it is preferable to increase the area where the wiping section 67 rubs the surface of the transport belt 27.

When the ink has a high viscosity at high temperature and low humidity or the like, in order to increase the area where the wiping section 67 rubs the surface of the transport belt 27, the rotation amount of the transport belt 27 per first cleaning operation may be increased compared to a case where the ink has low viscosity at low temperature and high humidity. In this case, since the ink absorption performance to the web 66 is not so important as compared with the low-viscosity ink, the rotation speed of the transport belt 27 may be set to be higher than that in the case of the low-viscosity ink. As a result, the wiping performance of the high-viscosity ink can be improved by increasing the area (number of times) of the wiping section 67 rubbing the surface of the transport belt 27 in the first cleaning operation. As described above, the control section 15 may change the cleaning speed of the first cleaning operation based on the temperature and humidity information obtained from the temperature sensor 94 and the humidity sensor 95.

Therefore, according to this embodiment, the following effects can be obtained.

(1) The liquid discharge apparatus 11 includes the transport belt 27 that transports the medium 17, the discharge section 19 that discharges the liquid to the medium 17 transported by the transport belt 27, the cleaning mechanism 60 that cleans the transport belt 27, and the control section 15 that controls the cleaning mechanism 60. The cleaning mechanism 60 includes the web 66 that abuts against the transport belt 27 and wipes off the liquid on the transport belt 27, and the driving section 64 that changes the wiping surface 67A of the web 66 that abuts against the transport belt 27. The control section 15 performs the first operation of changing the wiping surface 67A of the web 66 that abuts against the transport belt 27 a predetermined number of times within the cleaning period for cleaning the transport belt 27. According to this configuration, the first operation is performed a predetermined number of times within the cleaning period. That is, the web 66 is intermittently driven. Thereby, the life of the web 66 can be extended as compared with the configuration of the related art in which a new web contact surface is constantly sent out to the belt surface.

(2) The control section 15 acquires information on the amount of liquid discharged from the discharge section 19 toward the medium 17. The control section 15 determines a predetermined number of times based on the information. When the amount of the liquid is the first amount, the control section 15 sets a predetermined number of times as the first number of times m1. When the amount of the liquid is a second amount less than the first amount, the control section 15 sets the predetermined number of times as the second number of times m2 less than the first number of times m1. According to this configuration, the number of times of performing the first operation is changed according to the amount of the liquid adhering to the transport belt 27. For example, when the amount of liquid adhering to the transport belt 27 is small, the number of first operations is reduced. Thereby, the life of the web 66 can be extended while achieving the cleaning effect.

(3) The control section 15 acquires information on at least one of humidity and temperature in the apparatus main body 12. The control section 15 determines a predetermined number of times based on the information. Wiping performance deteriorates due to the increase in the viscosity of the ink at high temperature and low humidity. According to this configuration, since the temperature and humidity are changed, the transport belt 27 can be appropriately cleaned.

(4) The control section 15 acquires information on the cumulative number of sheets of the medium 17 transported by the transport belt 27. The control section 15 determines a predetermined number of times based on the information. When the cumulative number of sheets TM of the medium 17 is the first number of sheets TM1, the control section 15 sets a predetermined number of times as the first number of times m1. When the cumulative number of sheets TM of the medium 17 is the second number of sheets TM2 less than the first number of sheets TM1, the control section 15 sets the predetermined number of times as the second number of times m2 less than the first number of times m1. According to this configuration, the transport belt 27 deteriorates as the number of media 17 increases. Even in this case, the transport belt 27 can be appropriately cleaned by increasing the predetermined number of times.

(5) The control section 15 causes the transport belt 27 to rotate at the first speed V1 from the start of cleaning to the predetermined time, and after the predetermined time, the control section 15 causes the transport belt 27 to rotate at the second speed V2 faster than the first speed V1. According to this configuration, at the initial stage of the cleaning period, by rotating the transport belt 27 at a low speed, the time for the transport belt 27 to abut against the web 66 becomes long, and thus the ink on the transport belt 27 is easily wiped (absorbed) by the web 66. As a result, a predetermined number of times required for cleaning can be reduced.

(6) The web 66 is the endless web 66. According to this configuration, in the case of the endless web 66, a particularly long life is required, but in this configuration, the life can be extended.

(7) The cleaning mechanism 60 includes the wiper 87. The wiper 87 is provided upstream of the web 66 in the rotation direction BD in which the transport belt 27 rotates, abuts against the transport belt 27, and scrapes off the liquid on the transport belt 27. According to this configuration, since the wiper 87 is further provided, cleaning can be performed more appropriately.

(8) The cleaning mechanism 60 includes the gears 72 to 75 that transmit the power from the driving section 64. The web 66 has a configuration in which the wiping surface 67A is changed by being sent by receiving power from the driving section 64 via the gears 72 to 75. The sending direction WD in which the web 66 is sent coincides with the direction in which the web 66 receives the frictional force from the transport belt 27 that rotates in a state where the web 66 abuts against the transport belt 27.

When the direction in which the web 66 is sent is opposite to the direction in which the transport belt 27 rotates, a driving amount until the backlashes of the gears 72 to 75 are clogged is required until the sending operation of the web 66 is started. Therefore, the sending amount of the web 66 at the time of intermittent driving may not be stable. According to this configuration, when the web 66 is intermittently driven, the backlash is maintained in a clogged state, and thus the sending amount of the web 66 is stable. For example, even when the sending amount of the web 66 is suppressed to a value close to the minimum necessary for changing to the new wiping surface 67A, the wiping surface 67A of the web 66 can substantially certainly be changed to the new surface. Therefore, the web 66 having a limited length can be efficiently used for cleaning, which can contribute to extending the life of the cleaning mechanism 60.

(9) The cleaning mechanism 60 includes the detection section 83 that measures the rotation amount of the driving section 64. The detection section 83 includes the plurality of detected sections 84B provided at intervals in the peripheral direction of the disk 84A that rotates integrally with the rotation shaft 76A of the driving section 64, and the sensor 85 for sequentially detecting the plurality of detected sections 84B. In this configuration in which the web 66 is intermittently driven, the sending amount of the web 66, that is, the rotation amount of the driving section 64 is extremely small. Therefore, depending on the configuration of the detection section, it may be difficult to measure the rotation amount with a required accuracy. On the other hand, since the detection section 83 includes a plurality of detected sections 84B, it is possible to measure even an extremely small rotation amount of the driving section 64.

(10) The control method of the liquid discharge apparatus 11 including the transport belt 27, the discharge section 19, the web 66, and the driving section 64 includes the first step of changing the wiping surface 67A of the web 66 that abuts against the transport belt 27. Within the cleaning period for cleaning the transport belt 27, the first step is performed a predetermined number of times. According to the method, the life of the web 66 can be extended as compared with the configuration of the related art in which a new web contact surface is constantly sent out to the belt surface.

The above-described embodiments can also be changed to an aspect such as the modification example illustrated below. Furthermore, a further modification example may also be an appropriate combination of the above-described embodiment and the modification examples illustrated below, or an appropriate combination of the modification examples illustrated below may be a further modification example.

In the first cleaning operation in step S21, at least for the first time, the low-speed cleaning operation (hereinafter refer to as a "first low-speed cleaning operation") may be performed at a lower speed than the low-speed cleaning operation (hereinafter refer to as a "second low-speed cleaning") of the predetermined number of times (M3-th time). For example, the computer 100 determines whether or not the number of times of web sending N is less than a threshold number of times K. Here, the threshold number of times K is a threshold value of the number of times for performing the first low-speed cleaning operation. The threshold number of times K is a natural number satisfying $1 \le K < M3$. When N<K, the first low-speed cleaning operation is performed in step S21. When N<K (that is, N≥K) is not satisfied, the second low-speed cleaning is performed. Here, the threshold number of times K may be a constant value or may be set according to the amount of ink erroneously discharged onto the transport belt 27 when the first jam occurs. For example, the threshold number of times K may be determined according to the printing duty value when the first jam occurs. As the printing duty value is larger, the threshold number of times K is determined to be a larger value. In other words, the threshold number of times K when the printing duty value is the first printing duty value is defined as a first threshold number of times K1. A second threshold number of times K2, which is the threshold number of times K when the printing duty value is the second printing duty value larger than the first printing duty value, is determined to be a value larger than the first threshold number of times K1. In this modification example, a predetermined time (total execution time) in which the first low-speed cleaning operation is executed is managed by the threshold number of times K of the number of times of web sending. That is, the time obtained by multiplying the threshold number of times K by each execution time of the first low-speed cleaning operation corresponds to a predetermined time. When a predetermined time elapses from the start of cleaning, the process shifts to the second low-speed cleaning operation. In this modification example, within the execution period of the first cleaning operation, control for rotating the transport belt 27 at the first speed V1 from the start of cleaning to the predetermined time, and after the predetermined time, rotating the transport belt 27 at the second speed V2 faster than the first speed V1 is performed.

The control section 15 intermittently sends the web 66 in a state where the wiping section 67 is in the cleaning position CP where the wiping section 67 abuts against the transport belt 27 during cleaning, but the present disclosure is not limited thereto. For example, during cleaning, when one first cleaning operation is ended, the position may be switched to the retracted position RP where the wiping section 67 is separated from the transport belt 27, and the web 66 may be intermittently sent while remaining in the retracted position RP. That is, when the first cleaning operation is ended during cleaning, the wiping section 67 may be separated from the transport belt 27, and the web 66 may be intermittently sent in this retracted state. In this case, the following cleaning method may be performed. The control section 15 may perform a separation step of performing the operation of switching the web 66 from the abutting state of abutting against the transport belt 27 to the separated state of separating from the transport belt 27 a predetermined number of times, and an abutting step of performing the operation of switching the web 66 from the separated state to the abutting state a predetermined number of times. Then, within the cleaning period, a series of steps performed in the order of the separation step, the first step, and the abutting step may be performed a predetermined number of times. According to the control method of the liquid discharge apparatus 11, when the web 66 is intermittently driven in a state where the web 66 abuts against the transport belt 27, a load may be generated on the driving section 64. In a state where the web 66 is separated from the transport belt 27, the first operation of changing the wiping surface 67A of the web 66 that abuts against the transport belt 27 is performed. Therefore, as compared with the case where the first operation is performed in a state where the web 66 is in contact with the transport belt 27, it is possible to suppress the sending operation of the web 66 from being affected by the rotational load of the transport belt 27. For example, when the web 66 is less likely to be affected by the rotational load of the transport belt 27, the accuracy of the sending amount of the web 66 can be improved.

The determination of the predetermined number of times based on the information on the amount of the liquid discharged from the discharge section 19 toward the medium 17 may be performed by multiplying an initial value of the previously determined predetermined number of times by a correction coefficient according to the information on the amount of liquid discharged from the discharge section 19 toward the medium 17.

The correction of a predetermined number of times based on information on at least one of humidity and temperature is not limited to the configuration performed with reference to the second reference data RD2 such as table data, and may be performed by multiplying the predetermined number of times by a correction coefficient according to the information on at least one of humidity and temperature.

The information on the temperature and humidity may be acquired from a temperature and humidity sensor inside the apparatus main body 12, or may be acquired from a temperature and humidity sensor outside the apparatus. Here, the temperature and humidity sensor may be configured by a temperature sensor and a humidity sensor, or may be configured by the temperature sensor and the humidity sensor as one sensor unit.

In the case of high temperature and low humidity, the number of times of rubbing with the web 66 may be increased by increasing the rotation speed of the transport belt 27 or increasing the number of rotations. That is, in the case of high temperature and low humidity, the viscosity of a liquid such as ink tends to increase. For example, the high-viscosity ink can be removed more effectively by rubbing than by absorbing the ink in the web 66. In order to enhance the rubbing effect of the web 66, the rotation speed of the transport belt 27 is increased or the number of rotations is increased in the case of high temperature and low humidity.

When the viscosity of the ink is high, the amount of rubbing of the transport belt 27 by the web 66 may be increased by increasing the rotation amount of the transport belt 27, rather than increasing the number of times of discharging the new wiping surface 67A of the web 66. Since ink having high viscosity tends to fix to the transport belt 27, it is difficult to remove contamination of the ink by wiping once (for example, one rotation of the belt). Therefore, the number of times the contamination of ink are rubbed (for example, the number of times the belt rotates) may be increased. By increasing the rotation amount of the transport belt 27 per one wiping surface, the amount of rubbing of the transport belt 27 per one wiping surface may be increased. Also, when the viscosity of the ink is high, the number of times the new wiping surface 67A of the web 66 is exposed may be increased in one cleaning as compared with the case where the viscosity is low.

It is sufficient for the control section 15 to acquire information on at least one of humidity and temperature in the apparatus main body 12. Specifically, the control section 15 is not limited to the configuration for acquiring information on both humidity and temperature in the apparatus main body 12, and may acquire information on only humidity or information on only temperature. Not limited to the humidity and temperature in the apparatus main body 12, the information on at least one of the humidity and temperature in the surroundings in the apparatus main body 12 may be acquired. As long as the difference in humidity and temperature between the inside of the apparatus main body 12 and the outer periphery of the apparatus main body 12 is within an allowable range, the disposition position of the temperature sensor 94 and the humidity sensor 95 may be inside the apparatus main body 12 or may be around the outside of the apparatus main body 12.

The correction coefficient A used for correcting the predetermined number of times according to the information on the cumulative number of sheets TM is not limited to the linear graph line proportional to the cumulative number of sheets TM illustrated in FIG. 11, but may be acquired with reference to table data or the like based on the stepped graph lines and curved graph lines. Further, the correction coefficient A may be acquired by the arithmetic section 108 performing a calculation based on a predetermined calculation formula.

The predetermined number of times M1 may be acquired by performing a calculation based on a predetermined calculation formula using the printing duty value. Further, the predetermined number of times M1 may be acquired by performing a calculation based on a predetermined calculation formula using each value of the temperature and the humidity.

The web 66 is not limited to being endless. For example, one end may be wound around the first roller and the other end may be wound around the second roller. In this case, the web 66 unwound from the first roller may be wound around the second roller.

The control section 15 may rotate the transport belt 27 at a constant speed within the cleaning period. Further, the control section 15 may rotate the transport belt 27 in a multi-step manner or at an increase in speed in proportion to time within the cleaning period.

JP-A-2005-169968 is wasteful because a certain amount of the web 66 is used for cleaning regardless of the printing duty value. On the other hand, in the present embodiment, since the amount (the number of times of web sending) that the wiping surface 67A of the web 66 can be changed is changed according to the printing duty value, it is possible to suppress the web 66 from becoming wasteful. For example, when the web 66 is sent with a constant sending amount regardless of the printing duty value, even when the amount of ink to be wiped off is large when the printing duty value is high, a larger web sending amount should be set based on the case where the amount of ink is large to secure the required cleaning quality. In this case, the web becomes wasteful when the amount of ink to be wiped is small at a low printing duty value.

The cleaning mechanism 60 may not be provided with the wiper 87.

The detection section 83 may be a rotary encoder. That is, the rotation of the rotation shaft 76A may be detected by the rotary encoder.

The transport belt 27 may be rotated a plurality of times with respect to one wiping surface 67A. In this case, it is possible to extend the life of the web 66 and eventually the cleaning mechanism 60 as compared with the related art.

The medium 17 is not limited to paper or the like, and may be a fabric such as cloth or non-woven fabric, board paper, a film made of synthetic resin, a laminated medium, or the like.

The liquid discharge apparatus 11 is not limited to an ink jet printing apparatus (printer) that prints on paper, and may be a textile printing apparatus. The transport belt may have an adhesive layer on the surface.

Hereinafter, the technical idea grasped from the embodiments and the modification examples will be described together with the effect.

(A) There is provided a liquid discharge apparatus including: a transport belt that transports a medium; a discharge section that discharges a liquid to the medium transported by the transport belt; a cleaning mechanism that cleans the transport belt; and a control section that controls the cleaning mechanism, in which the cleaning mechanism includes a web that abuts against the transport belt and wipes off the liquid on the transport belt, and a driving section that changes a wiping surface of the web that abuts against the transport belt, and the control section performs a first operation of changing the wiping surface of the web that abuts against the transport belt a predetermined number of times within a cleaning period for cleaning the transport belt.

According to this configuration, the first operation is performed a predetermined number of times within the cleaning period. That is, the web is driven intermittently. Thereby, the life of the web can be extended as compared with the configuration of the related art in which a new web contact surface is constantly sent out to the belt surface.

(B) In the liquid discharge apparatus according to the above (A), the control section may acquire information on an amount of the liquid discharged from the discharge section toward the medium, determine the predetermined number of times based on the information, set the predetermined number of times as a first number of times when the amount of the liquid is a first amount, and set the predetermined number of times as a second number of times less than the first number of times when the amount of the liquid is a second amount less than the first amount.

According to this configuration, the number of times of performing the first operation is changed according to the amount of the liquid adhering to the transport belt 27. For example, when the amount of liquid adhering to the transport belt is small, the number of first operations is reduced. Thereby, the life of the web 66 can be extended while achieving the cleaning effect.

(C) In the liquid discharge apparatus according to the (A) or (B), in which the control section may acquire information on at least one of humidity and temperature in an apparatus main body, and may determine the predetermined number of times based on the information.

Wiping performance deteriorates due to the increase in the viscosity of the ink at high temperature and low humidity. According to this configuration, since the temperature and humidity are changed, the belt can be appropriately cleaned.

(D) In the liquid discharge apparatus according to the above (A) to (C), the control section may acquire information on a cumulative number of sheets of the medium transported by the transport belt, may determine the predetermined number of times based on the information, may set the predetermined number of times as a first number of times when the cumulative number of sheets of the medium is a first number of sheets, and may set the predetermined number of times as a second number of times less than the first number of times when the cumulative number of sheets of the medium is a second number of sheets less than the first number of sheets.

According to this configuration, the transport belt deteriorates as the number of media increases. Even in this case, the belt can be appropriately cleaned by increasing the predetermined number of times.

(E) In the liquid discharge apparatus according to any one of the above (A) to (D), the control section may cause the transport belt to rotate at a first speed from a start of cleaning to a predetermined time, and after the predetermined time, the control section may cause the transport belt to rotate at a second speed faster than the first speed.

According to this configuration, at the initial stage of the cleaning period, by rotating the transport belt at a low speed, the time for the transport belt to abut against the web becomes long, and thus the ink on the transport belt is easily wiped (absorbed) by the web. As a result, a predetermined number of times required for cleaning can be reduced.

(F) In the liquid discharge apparatus according to any one of (A) I(E) above, the web may be an endless web.

According to this configuration, in the case of the endless web, a particularly long life is required, but in this configuration, the life can be extended.

(G) In the liquid discharge apparatus according to any one of the above (A) to (F), the cleaning mechanism may include a wiper which is provided upstream of the web in a rotation direction in which the transport belt rotates, abuts against the transport belt, and scrapes off the liquid on the transport belt.

According to this configuration, since the wiper is further provided, cleaning can be performed more appropriately.

(H) In the liquid discharge apparatus according to any one of the above (A) to (G), the cleaning mechanism may include gears that transmit power from the driving section, the web may be configured to change the wiping surface by being sent by power received from the driving section via the gears, and the direction in which the web is sent may coincide with a direction in which the web receives a frictional force from the transport belt that rotates in a state where the web abuts against the transport belt.

When the direction in which the web is sent is opposite to the direction in which the transport belt rotates, a driving amount until the backlash of the gear is clogged is required until the sending operation of the web is started. Therefore, the sending amount of the web at the time of intermittent driving may not be stable. According to this configuration, when the web is intermittently driven, the backlash is maintained in a clogged state, and thus the sending amount of the web is stable.

(I) In the liquid discharge apparatus according to any one of the above (A) to (H), the cleaning mechanism may include a detection section that measures a rotation amount of the driving section, and the detection section may include a plurality of detected sections provided at intervals in a peripheral direction of a disk that rotates integrally with a rotation shaft of the driving section, and a sensor that sequentially detects the plurality of detected sections.

According to this configuration, in the case of the configuration in which the web is intermittently driven, the sending amount of the web, that is, the rotation amount of the driving section is extremely small. Therefore, depending on the configuration of the detection section, it may be difficult to measure the rotation amount with the required accuracy. According to this configuration, since the detection section includes a plurality of detected sections, even an extremely small rotation amount of the driving section can be measured.

(J) There is provided a control method of a liquid discharge apparatus including a transport belt that transports a medium, a discharge section that discharges a liquid to the medium transported by the transport belt, a web that abuts against the transport belt and wipes off the liquid on the transport belt, and a driving section that changes a wiping surface of the web that abuts against the transport belt, the method including: a first step of changing a wiping surface of the web that abuts against the transport belt, in which the first step is performed a predetermined number of times within a cleaning period for cleaning the transport belt.

According to the method, the life of the web can be extended as compared with the configuration of the related art in which a new web contact surface is constantly sent out to the belt surface.

What is claimed is:

1. A liquid discharge apparatus comprising:

a transport belt that transports a medium;

a discharge section that discharges a liquid to the medium transported by the transport belt;

a cleaning mechanism that cleans the transport belt; and a control section that controls the cleaning mechanism, wherein the cleaning mechanism includes a web that abuts against the transport belt and wipes off the liquid on the transport belt, and a driving section that changes a wiping surface of the web that abuts against the transport belt, and the control section performs a first operation of changing the wiping surface of the web that abuts against the transport belt a predetermined number of times within a cleaning period for cleaning the transport belt;

acquires information on an amount of the liquid discharged from the discharge section toward the medium, determines the predetermined number of times based on the information, sets the predetermined number of times as a first number of times when the amount of the liquid is a first amount, and sets the predetermined number of times as a second number of times less than the first number of times when the amount of the liquid is a second amount less than the first amount.

2. The liquid discharge apparatus according to claim 1, wherein the control section acquires information on at least one of humidity and temperature in an apparatus main body, and determines the predetermined number of times based on the information.

3. The liquid discharge apparatus according to claim 1, wherein the control section
acquires information on a cumulative number of sheets of the medium transported by the transport belt,
determines the predetermined number of times based on the information,
sets the predetermined number of times as a first number of times when the cumulative number of sheets of the medium is a first number of sheets, and
sets the predetermined number of times as a second number of times less than the first number of times when the cumulative number of sheets of the medium is a second number of sheets less than the first number of sheets.

4. The liquid discharge apparatus according to claim 1, wherein
the control section causes the transport belt to rotate at a first speed from a start of cleaning to a predetermined time, and after the predetermined time, the control section causes the transport belt to rotate at a second speed faster than the first speed.

5. The liquid discharge apparatus according to claim 1, wherein
the web is an endless web.

6. The liquid discharge apparatus according to claim 1, wherein
the cleaning mechanism includes a wiper which is provided upstream of the web in a rotation direction in which the transport belt rotates, abuts against the transport belt, and scrapes off the liquid on the transport belt.

7. The liquid discharge apparatus according to claim 1, wherein
the cleaning mechanism includes gears that transmit power from the driving section,
the web is configured to change the wiping surface by being sent by power received from the driving section via the gears, and
the direction in which the web is sent coincides with a direction in which the web receives a frictional force from the transport belt that rotates in a state where the web abuts against the transport belt.

8. The liquid discharge apparatus according to claim 1, wherein
the cleaning mechanism includes a detection section that measures a rotation amount of the driving section, and
the detection section includes a plurality of detected sections provided at intervals in a peripheral direction of a disk that rotates integrally with a rotation shaft of the driving section, and a sensor that sequentially detects the plurality of detected sections.

9. A control method of a liquid discharge apparatus including a transport belt that transports a medium, a discharge section that discharges a liquid to the medium transported by the transport belt, a web that abuts against the transport belt and wipes off the liquid on the transport belt, and a driving section that changes a wiping surface of the web that abuts against the transport belt, the method comprising:
changing a wiping surface of the web that abuts against the transport belt
acquiring information on an amount of the liquid discharged from the discharge section toward the medium,
based on the acquired information, determining a predetermined number of times to change the wiping surface of the web within a cleaning period for cleaning the transport belt, setting the predetermined number of times as a first number of times when the amount of the liquid is a first amount, and
setting the predetermined number of times as a second number of times less than the first number of times when the amount of the liquid is a second amount less than the first amount.

* * * * *